(12) United States Patent
Moser

(10) Patent No.: US 9,355,029 B2
(45) Date of Patent: May 31, 2016

(54) THREAD-BASED MEMORY MANAGEMENT WITH GARBAGE COLLECTION

(71) Applicant: SAP SE, Walldorf (DE)

(72) Inventor: Martin Moser, Walldorf (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 13/930,931

(22) Filed: Jun. 28, 2013

(65) Prior Publication Data

US 2015/0006843 A1    Jan. 1, 2015

(51) Int. Cl.
*G06F 12/00* (2006.01)
*G06F 12/02* (2006.01)

(52) U.S. Cl.
CPC .......... *G06F 12/0253* (2013.01); *G06F 12/023* (2013.01)

(58) Field of Classification Search
None
See application file for complete search history.

(56) References Cited

U.S. PATENT DOCUMENTS

| | | | |
|---|---|---|---|
| 6,671,707 B1 | 12/2003 | Hudson et al. | |
| 6,681,306 B1 * | 1/2004 | Kessler et al. | 711/171 |
| 6,826,583 B1 | 11/2004 | Flood et al. | |
| 7,149,870 B2 | 12/2006 | Blandy | |
| 7,197,521 B2 | 3/2007 | Subramoney et al. | |
| 7,484,067 B1 | 1/2009 | Bollella et al. | |
| 7,587,721 B2 | 9/2009 | Schmidt et al. | |
| 7,624,395 B2 | 11/2009 | Dostert | |
| 7,640,544 B2 | 12/2009 | Flood et al. | |
| 7,971,010 B2 | 6/2011 | Schmelter et al. | |
| 8,024,505 B2 | 9/2011 | Dahlstedt et al. | |
| 8,255,436 B2 | 8/2012 | Garst, Jr. et al. | |
| 8,266,190 B2 | 9/2012 | Johnson | |
| 2001/0037336 A1 * | 11/2001 | Sauntry et al. | 707/10 |
| 2005/0065985 A1 * | 3/2005 | Tummala et al. | 707/201 |
| 2006/0136916 A1 * | 6/2006 | Rowland et al. | 718/100 |
| 2008/0005190 A1 * | 1/2008 | Fey et al. | 707/202 |
| 2011/0138363 A1 | 6/2011 | Schmelter et al. | |
| 2011/0264712 A1 | 10/2011 | Ylonen | |
| 2012/0089991 A1 | 4/2012 | Scheerer et al. | |

* cited by examiner

*Primary Examiner* — Kevin Verbrugge
*Assistant Examiner* — Craig Goldschmidt
(74) *Attorney, Agent, or Firm* — Dilworth IP, LLC

(57) ABSTRACT

Systems and methods for thread-based memory management may include activating a processing thread. The memory may include a first region and a second region with the first region having several segments. A segment of memory may be allocated for the processing thread. Data associated with an object may be stored in the segment. At the end of processing by the processing thread, a garbage collection process may be performed by the processing thread on the segment allocated to the processing thread.

20 Claims, 17 Drawing Sheets

THREAD-BASED MEMORY MANAGEMENT WITH GARBAGE COLLECTION

BACKGROUND

Programs executed by a processor of a computer utilize a computer-readable storage medium, such as a memory, data utilized by the program. Some programs, such as those written in programming languages like C, C++, or Pascal, for example, utilize explicit memory management. That is, memory is explicitly allocated and released by the program. Other programs, such as those written in programming languages like Java® or C#, for example, utilize implicit memory management. That is, memory is allocated by the programming language runtime system when an object is created and released through a process called garbage collection. Garbage collection is a process that identifies objects allocated in the memory that can no longer be accessed in the future (e.g., because a reference to the allocated memory has been eliminated) and releases the allocated portions of the memory to be utilized to store other objects. In some instances, garbage collection can be automatic, for example when a utilization threshold of the memory or a portion thereof is exceeded, or the garbage collection can be on-demand, such as by the program calling a function to initiate garbage collection.

SUMMARY

One implementation relates to a computer-implemented method for managing the allocation of memory. The method may include activating a processing thread. A first segment of a memory may be allocated for the processing thread. The memory includes a first region and a second region. The first region includes several segments. A determination may be made if data associated with an object is to be stored in the memory. Another determination may be made if the data associated with the object can be stored in a portion of the allocated first segment. The portion of the first segment may be allocated for storing the data associated with the object if the data associated with the object can be stored in the portion. The data associated with the object may be stored at the allocated portion of the first segment if the data associated with the object can be stored in the portion. A garbage collection process is performed on the allocated first segment at the end of the processing thread.

Another implementation relates to a system having a memory with a first region and a second region. The first region includes several segments. The system also includes a storage device storing instructions that, when executed by a processing module of the system, cause the processing module to perform several operations. The operations include activating a processing thread and allocating a first segment of the memory for the processing thread. The operations may further include determining if data associated with an object is to be stored in the memory and determining if the data associated with the object can be stored in a portion of the allocated first segment. The operations may also include determining if the first region has an allocatable second segment if the data associated with the object cannot be stored in the allocated first segment. If the data associated with the object cannot be stored in the allocated first segment and the first region has an allocatable second segment, then the operations may include allocating the second segment of the memory for the processing thread, allocating a portion of the second segment for storing the data associated with the object, and storing the data associated with the object at the allocated portion of the second segment. A garbage collection process may be performed on the first segment and the second segment at the end of the processing thread.

Yet another implementation relates to a non-transitory computer-readable storage device storing instructions that, when executed by a processing module, cause the processing module to perform several operations. The operations may include activating a processing thread and allocating a set of segments of a memory for the processing thread. The memory includes a first region and a second region. The first region includes several segments. Data associated with an object may be stored in a segment of the set of segments. A garbage collection process may be performed on the set of segments at the end of the processing thread, and the set of segments may be released.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
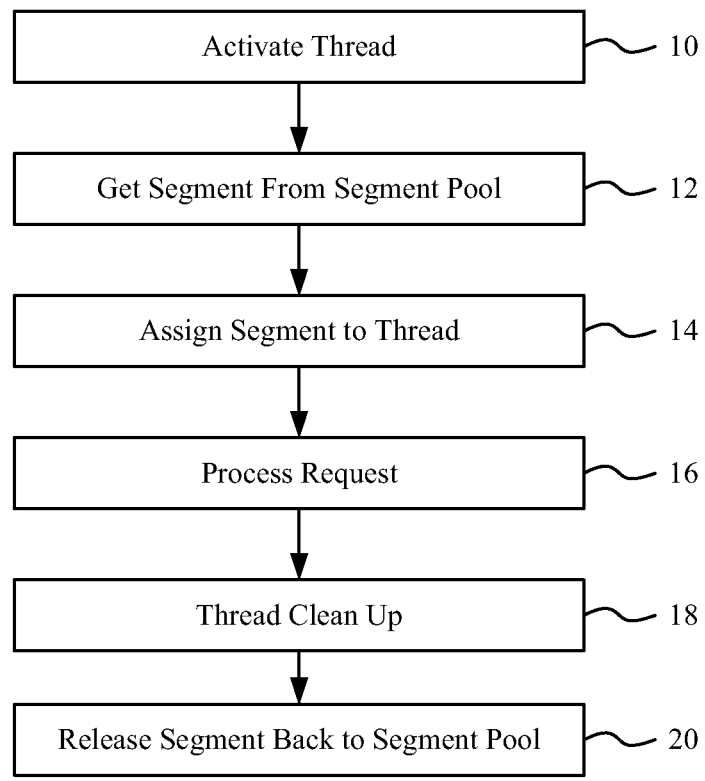
FIG. 1 is a flow diagram of an example process for allocating a segment of memory for a thread.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The following is merely provided for example purposes with the explicit understanding that the examples described herein will not be used to limit the scope or the meaning of the claims.

In the instance of implicit memory management, memory is allocated by the programming language runtime system when an object is created and released through a process called garbage collection. Garbage collection is a process that identifies objects allocated in the memory that can no longer be accessed in the future (e.g., because a reference to the allocated memory has been eliminated) and releases the allocated portions of the memory to be utilized to store other objects. In some instances, garbage collection requires the system to temporarily pause running operations to determine which portions of the memory are still actively being used and which are no longer being used. The garbage collection process then releases the portions of the memory that are no longer being used and permits the running operations to resume. Such a temporary halt in operations may be called a stop-the-world time.

In some instances, the stop-the-world times may be lengthy if a large portion of the memory is being utilized. For example, a system, such as a website hosting server, may have large memory that is accessed and utilized to respond to requests from end user devices for the resources hosted by the website hosting server. A request from an end user device may cause a thread (e.g., a sequence of programmed instructions) to be activated by the server to cause the requested resources to be retrieved from a computer-readable storage medium, such as a hard drive, and transmitted to the end user device via a network interface and network, such as via an Ethernet network interface and the internet. When the thread is operating, the data utilized by the thread and/or the instructions of the thread may be temporarily stored in the memory of the system. In the instance of implicit memory management, objects created by the thread are allocated in the memory by the programming language runtime system and released through garbage collection. In the example of a website hosting server, hundreds, thousands, and/or millions of threads may be operating in parallel to respond to requests from users. Accordingly, many objects may be created and allocated in the memory by such threads. When garbage collection occurs for a system having a very large memory, such as one capable of having hundreds, thousands, millions, billions, and/or trillions of objects allocated, the stoppage of the processing of threads may be lengthy due to the size of the memory and number of objects that need to be determined whether they are still utilized or not.

In some instances, it may be useful to limit the impact of such stop-the-world times for garbage collection. For example, a web server processing millions or billions of requests with object allocation in large memory heaps may have lengthy stop-the-world times for garbage collection. Accordingly, it may be useful to modify the memory management, and consequently, the garbage collection mechanism. One modification to the memory management may be to have a portion of the memory that may be allocated to threads and which the threads will release at the conclusion of processing of the thread. For example, a region of the memory, such as Region A described below, may include several segments that may be allocated to threads and released at the conclusion of the processing of the thread. Such dynamic allocation and release of the portion of the memory may reduce the frequency of, or even eliminate, the aforementioned stop-the-world times and/or may reduce the length of the stop-the-world times that occur in another portion of the memory, such as Region B described below, by reducing the number of objects that may be allocated and stored in Region B. Such a memory management modification may particularly benefit web servers.

In some implementations, the modifications to the memory management and/or the garbage collection mechanism may be valuable as it may be transparent to a developer and, in the case of Java®, does not change the Java® language semantics or the Java® 2 Platform Enterprise Edition (J2EE®) semantics of Java®. In addition, such a modification to the memory management may be particularly useful to software with short-running tasks that are executed by threads, such as web servers.

FIG. 1 is a flow diagram of an example process for allocating a segment to a processing thread. When a processing request is initiated, a thread may be activated (block 10). For example, a web server may have a pool of sleeping worker threads to process requests. When a request is received from a client device, such as a user requesting a web page, the web server actives a worker thread. The worker thread is configured to process and respond to the request. Each worker thread does not interfere with other worker threads.

A segment of memory, as will be described in greater detail below, may be retrieved from a pool of segments of a memory (block 12). By way of example, the retrieval of the segment of memory from the pool of segments may be done by retrieving an identifier (e.g., a memory address) for the segment from a list of identifiers. The segment is a portion of the memory where data for objects created during the processing of the request may be stored.

The segment may then be assigned to the thread (block 14). In the present example, the segment is assigned to the thread prior to the processing of the request and the creation of any objects. The assignment of the segment to the thread may be done by associating the identifier (e.g., memory address) of the segment with the thread and removing the identifier from the list of identifiers.

The thread may then process the request using the segment to store data during the processing (block 16). As the request is processed, objects may be allocated and the data for the objects may be stored in the segment and/or in other portions of the memory, as will be described in greater detail below.

Once the processing of the request is finished, then the thread cleans up the segment of memory (block 18). In some instances, most of the memory allocated by the thread may be garbage as soon as the request processing has been completed. Thus, theoretically the garbage can be collected immediately after the thread terminated. The cleaning up of the segment of memory by the thread may include the thread performing a garbage collection process, described in greater detail below. The garbage collection process may include identifying any surviving objects (e.g., objects that are still in use or will be used) in the segment and moving the surviving objects from the segment to another portion of the memory. Thus, each tread, after completing its task, cleans up "after itself"

The segment may then be returned to the pool of segments to be used by another thread to process another request (block 20). The return of the segment to the pool may include adding the identifier back to the list of identifiers. When the segment is assigned to another thread, the prior data stored in the segment may be overwritten when the new thread processes the new request. That is, the memory blocked by the garbage can be recycled and reused when processing one of the next requests. In the aforementioned example of a web server, the worker thread may also be returned to a pool of worker threads to respond to other requests. As may be appreciated, requests that only utilize a segment or several segments and the subsequent clean up of those segments after the thread is finished may reduce the frequency of or even eliminate the garbage collection processes performed on the memory or portions of the memory. One example of implementing such an allocation of segments to processing threads may include the following:

```
Loop
    wait( )              // thread t sleeps; arrival of r wakes t up
    s = free segment     // get free segment from segment pool
    t.setSegment(s)      // assign thread t initial segment s for object
                         allocation
    t.process(r)         // have thread t process request r
    t.cleanUp( )         // identifies survivors in segments of t and
                         evacuates them
    t.freeSegments( )    // returns segments of t back to the segment pool
Endloop
```

Figure 2A:
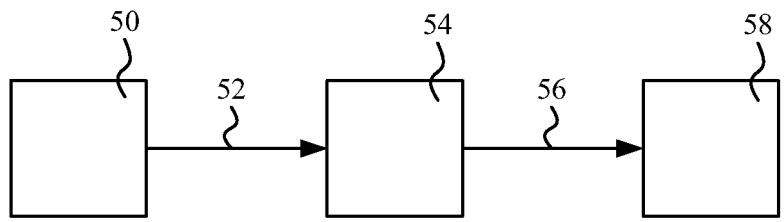
FIG. 2A is a block diagram depicting an example set of objects with two objects referring to another object.
Figure 2B:
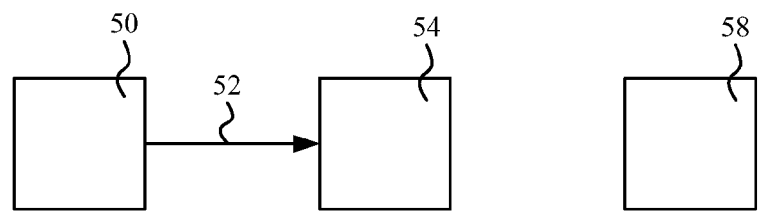
FIG. 2B is a block diagram depicting the set of objects of FIG. 2A with a reference to a third object eliminated.

FIG. 2A depicts a block diagram depicting an overview of an example set of objects that may be stored in a computer-readable storage medium that refer to other objects. In the example, a first object 50 has a first reference 52 to a second object 54. The first object 50 may be stored in a portion of a memory having an address (e.g., a fixed-length sequence of bits) identifying the location in the memory where the data for the first object 50 is stored. The first reference 52 may identify the address in the memory where the second object 54 is stored. In the example shown, the second object 54 may refer to a third object 58 via a second reference 56. During operation of a processing thread, the allocated memory for storing the data for the objects 50, 54, 58 may remain allocated and not be released during garbage collection if the reference to the first object 50 and the subsequent references 52, 56 to the second and third objects 54, 58 are not eliminated. In such an instance, the objects 50, 54, 58 are considered reachable objects as they are reachable, either directly or indirectly. FIG. 2B is a block diagram depicting the set of objects 50, 54, 58 of FIG. 2A with the second reference 56 to the third object 58 eliminated. For example, if the second object 54 is modified such that the second object 54 no longer references the third object 58, then the second reference 56 may be eliminated. If the third object 58 is not referenced by other objects and/or otherwise referenced, then the third object 58 is no longer considered reachable. When a garbage collection process occurs, the portion of the memory that was allocated for this third object 58 may be released to be used to store data for another object. As will be described below, garbage collection may occur through a variety of processes to identify and release the portions of memory having unreachable objects.

Figure 3A:
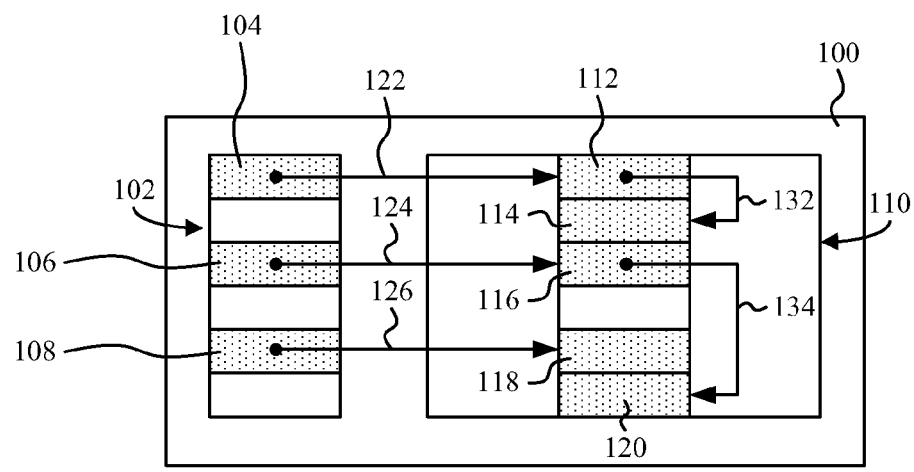
FIG. 3A is a block diagram depicting an example memory having a call stack and a heap showing several example objects in the heap.

FIG. 3A is a block diagram depicting an example memory 100 having a portion for a call stack 102 and a portion for a heap 110 and showing several example portions 112, 114, 116, 118, 120 of the memory 100 allocated for objects in the heap 110. The call stack 102 may include local variables, return addresses, parameter values, etc. In the present example, the call stack 102 includes several portions 104, 106, 108 that have references 122, 124, 126 to memory addresses for the portions 112, 116, 118 storing the data for the objects in the heap 110. Some of the portions 112, 116 storing the data for the objects include references 132, 134 to memory addresses for other portions 114, 120 in the heap 110 for other objects. An object having a portion of the memory allocated in the heap 110 is considered a root object if it is referenced by a parameter of the call stack, a local variable of the call stack, a static variable in a class, are a Java® native interface (JNI) reference, etc. In the present example, the portions 112, 116, 118 for the corresponding objects are considered root objects as they are referenced by references 122, 124, 126 of the portions 104, 106, 108 of the call stack 102 (such as parameters or local variables of the call stack 102). An object is considered reachable if it is a root object or referenced, directly or indirectly, by a root object. In the present example, the portions 112, 116, 118 for the corresponding objects are reachable as they are root objects. The portions 114, 120 for the corresponding objects are also considered reachable as they are referenced via references 132, 134 from the portions 112, 116 of root objects, respectively. During a garbage collection process, objects that are reachable are considered survivors. In the present example of FIG. 3A, if a garbage collection process occurs, the portions 112, 114, 116, 118, 120 for the corresponding objects would all be survivors and the portions 112, 114, 116, 118, 120 of the memory 100 for the objects would not be released. Any unreachable object would be considered garbage and the portions of the memory allocated for those objects would be released to be used for other objects.

Figure 3B:
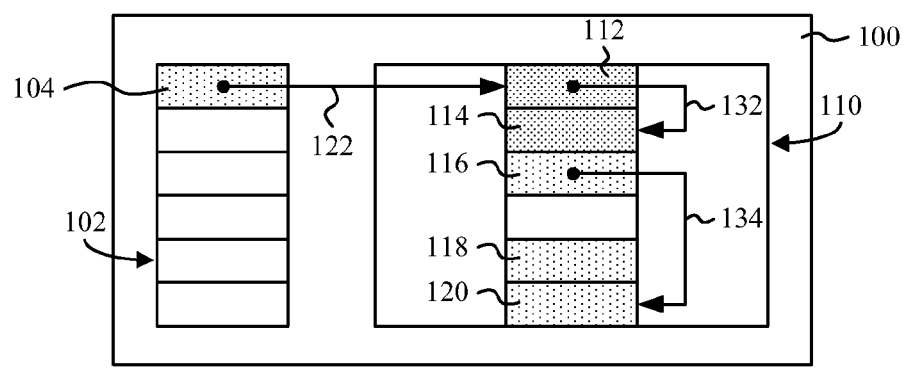
FIG. 3B is a block diagram of the example memory of FIG. 3A depicting a mark portion of an example mark and sweep collection algorithm.

FIG. 3B is a block diagram of the example memory 100 of FIG. 3A that depicts a mark portion of an example mark and sweep garbage collection algorithm. A mark and sweep garbage collection algorithm initially marks all the portions of the memory allocated for objects that are reachable (e.g., root objects or objects referenced, directly or indirectly, by root objects) and then sweeps (i.e., releases) the portions of the memory allocated to unreachable objects. In the example shown, the portions 112, 114 are marked (noted by the darker shading) during the mark portion of the mark and sweep algorithm. Marking may include setting a flag bit of the portion of the memory to a 1 (from a 0) to indicate that the portion of the memory is reachable. In the present example, the mark and sweep algorithm may initially halt the processing operations. The mark and sweep algorithm may then identify the portions of the memory 100 having root objects in the heap 110 by identifying the portions of the call stack 102 that are active and following the references, such as reference 122, to the addresses for the portions of the memory 100 referred to by the references. In the present example, only the portion 112 is for a root object. The marking portion of the mark and sweep algorithm may mark the portion 112 of the memory 100 for the object by setting the flag bit to a 1. The marking portion may then identify any portions of the memory 100 that are referenced by the portion 112 for the object. In this example, the portion 112 references another portion 114 for another object via reference 132. The marking portion of the mark and sweep algorithm may then mark the portion of the memory 100 for the portion 114 by setting the flag bit to a 1.

Figure 3C:
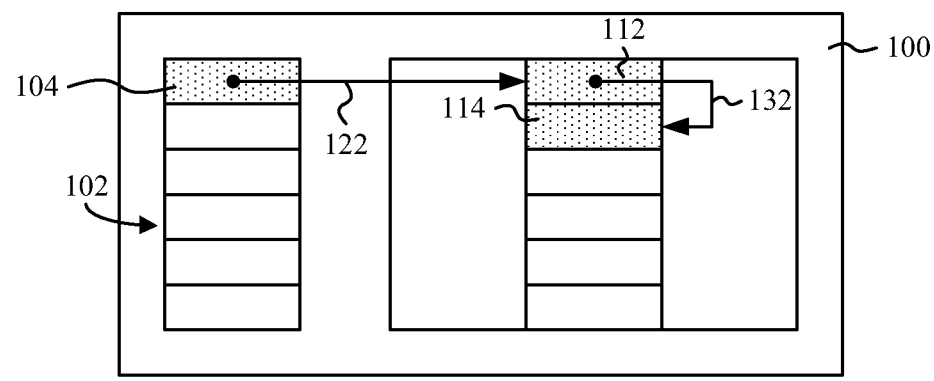
FIG. 3C is a block diagram of the example memory of FIG. 3A depicting a sweep portion of the example mark and sweep collection algorithm.

The other portions 116, 118, 120 are considered unreachable as they are no longer root objects and are not referenced, directly or indirectly, by root objects. Accordingly, the flag bits for the portions 116, 118, 120 for the corresponding objects may remain set to a 0 value. During the sweep portion of the mark and sweep algorithm, the portions of the memory that have flag bits set to 0 (i.e., the unreachable objects) may be released to be used to store data for other objects. FIG. 3C depicts a block diagram of the example memory 100 of FIG. 3A showing the memory 100 after a sweep portion of the example mark and sweep collection algorithm. In the example shown, the portions 116, 118, 120 of the heap 110 of the memory 100 that were allocated for the corresponding objects have been released to be used for storing data for other objects. The portions of the heap 110 of the memory 100 for the survivor objects, portions 112, 114, remain allocated. The flag bits for the portions of the heap 110 of the memory 100 may all be reset to 0 for subsequent mark and sweep algorithms. It can be appreciated that, after the mark and sweep garbage collection algorithm is executed, previously allocated portions 116, 118, 120 of the heap 110 of the memory 100 are now usable to store data for other objects for subsequent processing threads.

In some instances, the data for the survivor objects that is stored at the portions 112, 114 may be transferred to another portion of the heap 110 of the memory 100 (e.g., by copying the data from the current portion of the memory 100 to another portion). The references, such as references 122, 132, may be updated with the new addresses in the memory 100 for the new portions. The former portions 112, 114 of the heap 110 of the memory 100 previously allocated to for the data for the objects may be released to be used by other objects. Thus, several survivor objects may be reallocated in the memory 100 to compact the portions of the memory having those survivor object (i.e. defragmentation), thereby permitting larger sequential portions of the memory to be allocated as needed.

In some implementations, the mark and sweep garbage collection algorithm may be triggered when a predetermined portion of the heap 110 of the memory 100 has been allocated to store data for objects, such as 80%, 85%, 90%, 95%, 99%, 100%, etc. The mark and sweep algorithm for garbage collection may also be manually triggered, such as by call a garbage collection function by a program.

Figure 4A:
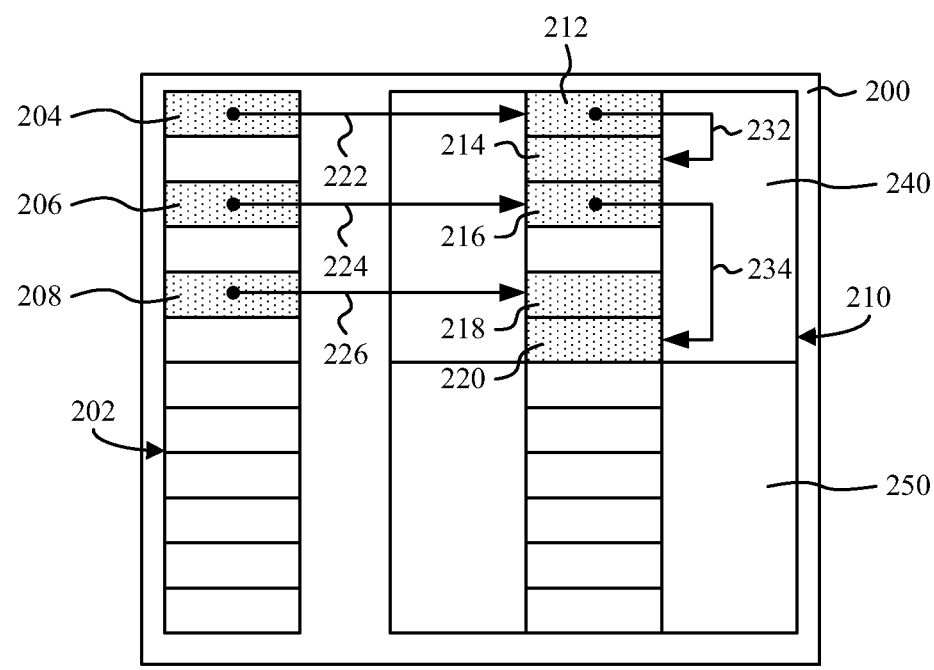
FIG. 4A is a block diagram depicting another example memory having a call stack and a heap, the heap being divided into a from-space and a to-space and showing several example objects in the from-space.

FIG. 4A is a block diagram depicting another example memory 200 having a call stack 202 and a heap 210. In this example, the heap 210 is divided into a from-space 240 and a to-space 250. The from-space 240 has portions 212, 214, 216, 218, 220 of the heap 210 of the memory 200 allocated to store data for several objects. The data for any other newly created objects may have a new portion of the memory 200 in the from-space 240 allocated as needed. In the present example, portions 204, 206, 208 of the call stack 202 reference root objects having data stored at portions 212, 216, 218 via references 222, 224, 226. The objects corresponding to the allocated portions 214, 220 are referenced by root objects stored at portions 212, 216 via references 232, 234, respectively.

Figure 4B:
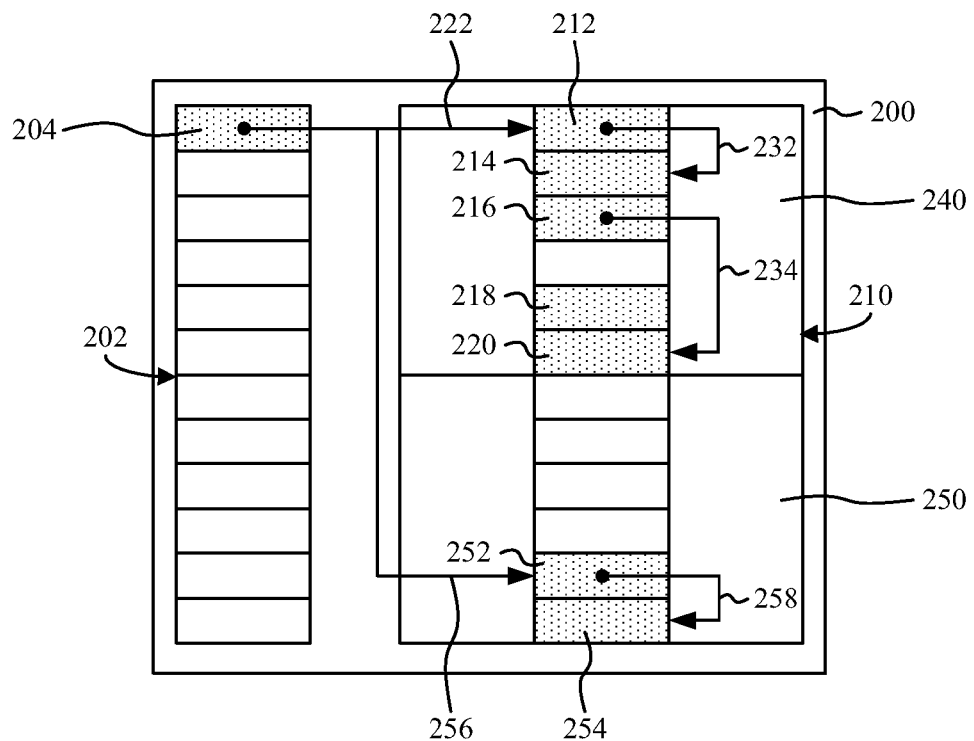
FIG. 4B is a block diagram of the example memory of FIG. 4A depicting a copying portion of an example copying collection algorithm.

FIG. 4B shows the example memory 200 of FIG. 4A during a copying portion of an example copying collection algorithm. A copying collection algorithm copies the data for all the objects that are reachable (e.g., root objects or objects referenced, directly or indirectly, by root objects) in the from-space to the to-space and then releases the portions of the memory in the from-space. The to-space becomes the new from-space (having the reachable survivor objects and any subsequently created and allocated objects) and the from-space becomes the new to-space for the next garbage collection. In the example shown in FIG. 4B, objects having memory allocated at the portions 212, 214 are considered survivor objects when a copying collection algorithm is implemented for garbage collection. In the present example, the copying collection algorithm may initially halt the processing operations. The copying collection algorithm may then identify the portions of the memory 200 having root objects in the heap 210 by identifying the portions of the call stack 202 that are active and following the references, such as reference 222, to the addresses for the portions of the memory 200 referred to by the references, such as the portion 212 allocated for object. In some implementations, the data located at the portion 212 of the from-space 240 of the heap 210 allocated for the corresponding survivor object can be copied to a newly allocated portion 252 of the to-space 250 of the heap 210. The reference 222 for the original portion 212 may be updated to a new reference 256 referring to the memory address for the newly allocated portion 252. The copying collection algorithm may follow any references, such as reference 232, from the old allocated portion 212 to any other allocated portions, such as portion 214, that the object referenced. For example, the data from the portion 214 may be copied to another newly allocated portion 254 in the to-space 250. The reference 232 for the original portion 214 may also be updated to a new reference 258 referring to the memory address for the newly allocated portion 254. The copying collection algorithm may follow any further references from the old allocated portion 214 to any other allocated portions that the object referenced. The old references 222, 232 to the old allocated portions 212, 214 may then be eliminated. In some implementations, the portions 212, 214 may be copied concurrently or sequentially. In the present example, the data in portions 216, 218, 220 is not copied to the to-space 250 as the objects are not reachable (e.g., root objects or objects referenced, directly or indirectly, by root objects).

Figure 4C:
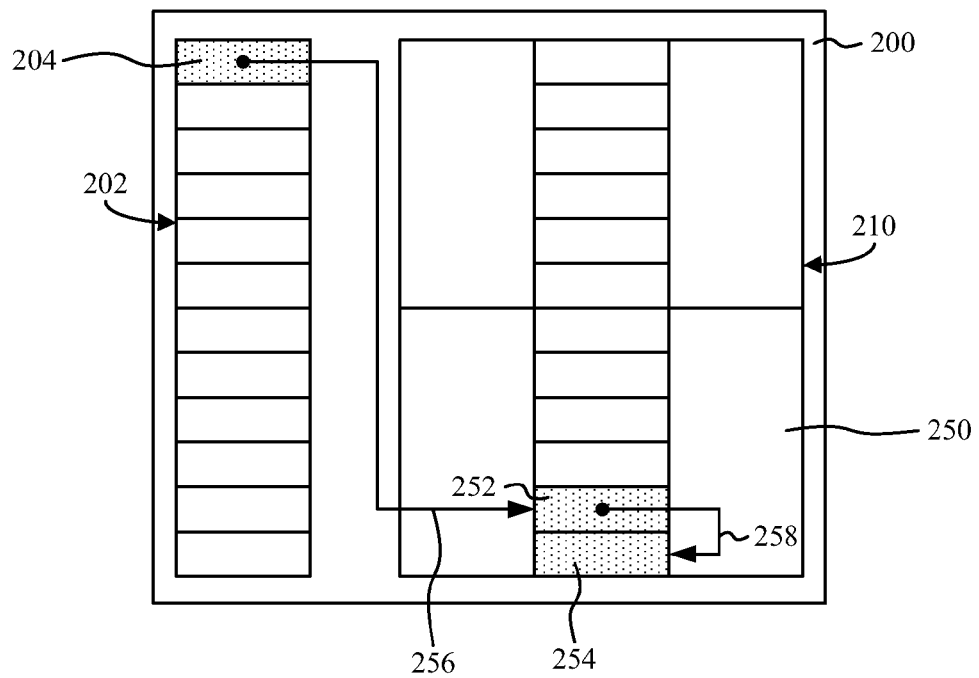
FIG. 4C is a block diagram of the example memory of FIG. 4A depicting an emptied from-space after the example copying collection algorithm.

FIG. 4C is a block diagram of the example memory 200 of FIG. 4A showing an emptied from-space 240 after the example copying collection algorithm has occurred. After the data for the reachable objects is copied from the from-space 240 to the to-space 250, the copying collection algorithm may release the portions of the from-space 240 to be utilized for copying the data from the portions of the to-space 250 back to the from-space 240 during another copying collection. Thus, the from-space 240 may be considered the new to-space and the to-space 250 may be considered the new from-space.

In some implementations, the copying collection algorithm may be triggered when a predetermined portion of from-space 240 of the heap 210 has been allocated to store data for objects, such as 80%, 85%, 90%, 95%, 99%, 100%, etc. The copying collection algorithm for garbage collection may also be manually triggered, such as by call a garbage collection function by a program.

Figure 5A:
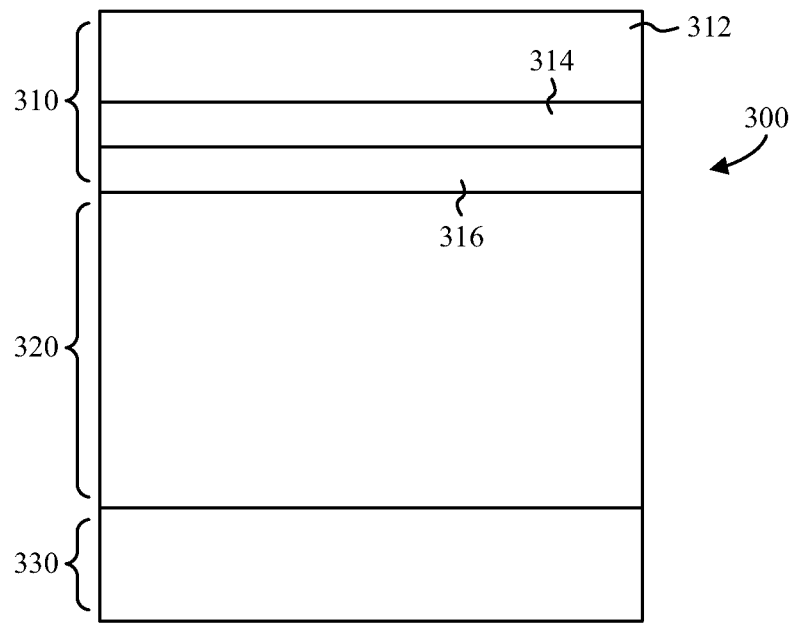
FIG. 5A is a block diagram depicting an example heap having several generations.

FIG. 5A is a block diagram depicting an example heap 300 having several portions as different generations. In the example shown, the heap 300 is divided into a first generation 310, a second generation 320 and a third generation 330. In the example shown, the first generation is further subdivided into an Eden space 312, a from-space 314, and a to-space 316. The third generation 330 may be used to store data for bytecode for classes, just-in-time (JIT) code, string constants, and/or other more permanently stored data. The second generation 320 may be used to store data for objects that have survived several garbage collections of the first generation 310 and are likely to be still in use. The first generation 310 may be used to initially store the data for objects. The Eden space 312 of the first generation 310 may be utilized as a first portion of the first generation 310 where the data for objects may be stored in allocated portions initially. The from-space 314 and the to-space 316 may be collectively considered the survivor space. It should be understood that the from-space 314 and to-space 316 may switch, as discussed above in reference to FIG. 4C. In the present example, the first generation 310 utilizes a copying collection algorithm for garbage collection and the second generation 320 and third generation 330 utilize a mark and sweep algorithm, though these are merely examples.

When an object is initially created, a portion of the Eden space 312 is allocated for storing the data for the object. As more objects are created, additional portions of the Eden space 312 are allocated for storing the data for the objects. In some instances, if the Eden space 312 has allocated all or a predetermined portion of the total space in the Eden space 312, newly created objects may have a portion allocated in the from-space 314. When the Eden space 312 and/or the from-space 314 have allocated all or a predetermined portion of the total space in the Eden space 312 and/or from-space 314, a garbage collection process may occur to release those portions of the first generation 310 of the heap 300 that are no longer in use because they are unreachable objects.

Figure 5B:
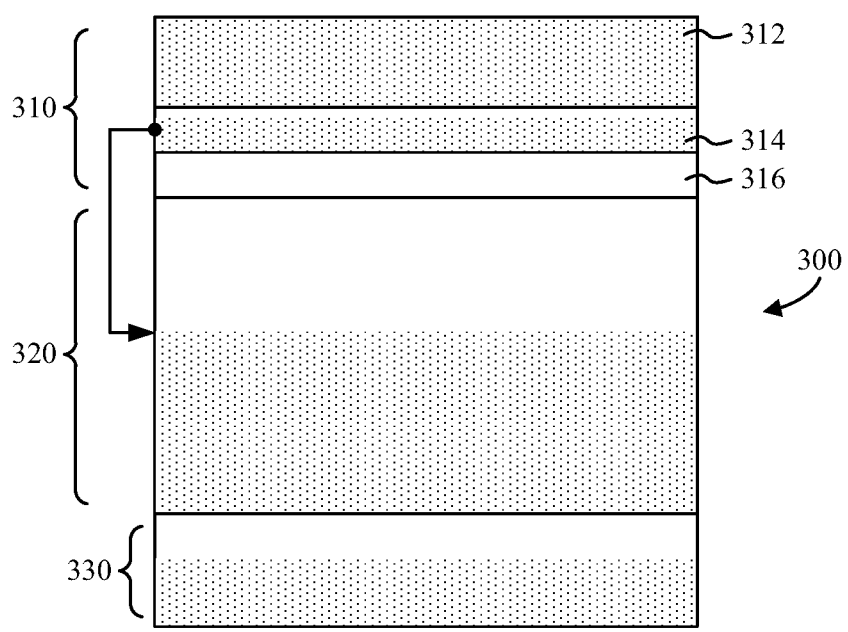
FIG. 5B is a block diagram of the heap of FIG. 5A depicting allocation of objects from a from-space to a second generation.

In some instances, surviving objects that have survived several garbage collections (which may be indicated by a flag bit or otherwise indicated by the data of the object stored in the first generation 310) of the first generation 310 may be transferred to the second generation 320 (i.e., promoted) by having the data for the object copied to an allocated portion of the second generation 320, as shown in FIG. 5B.

Figure 5C:
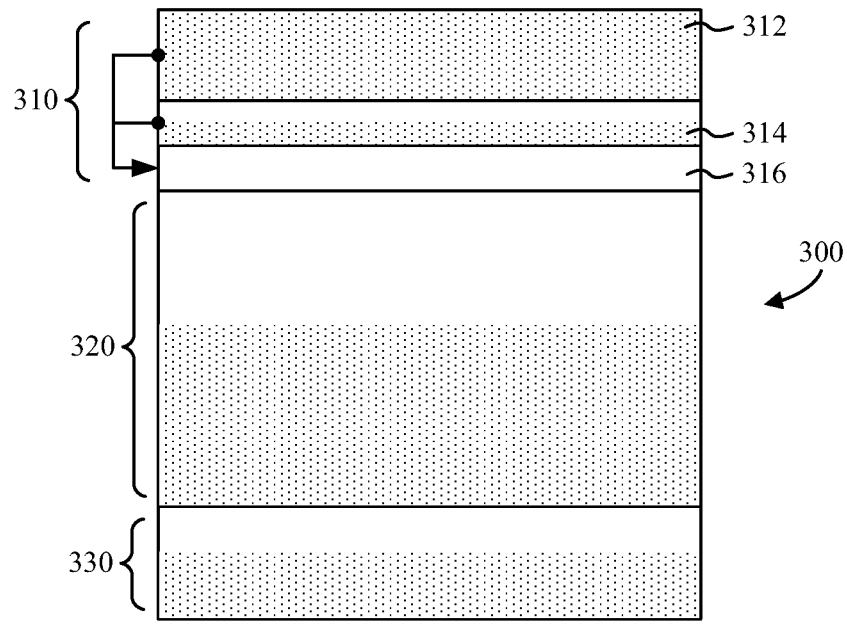
FIG. 5C is a block diagram of the heap of FIG. 5A depicting an allocation of objects from an Eden space and the from-space to a to-space.
Figure 5D:
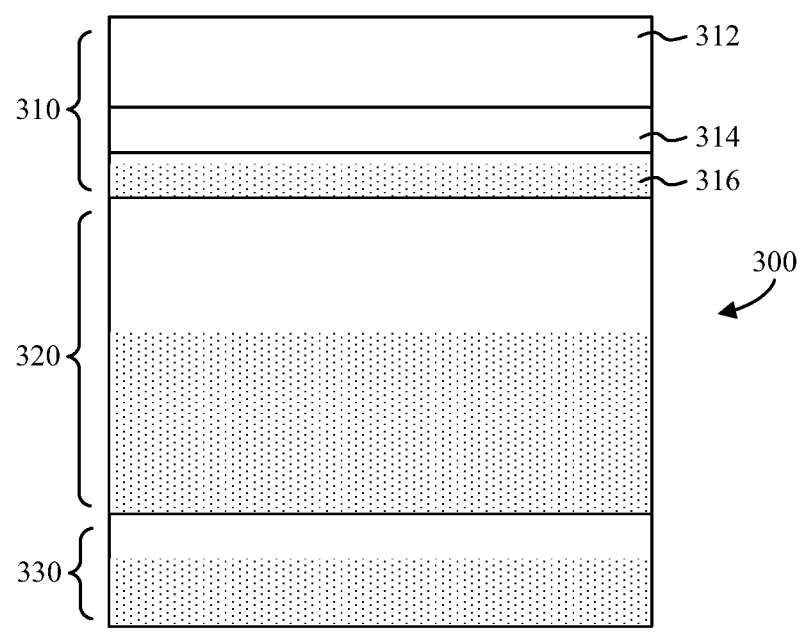
FIG. 5D is a block diagram of the heap of FIG. 5A depicting emptied Eden space and from-space after garbage collection.

When the garbage collection process occurs for the first generation 310, the data for the surviving objects may initially be transferred from the Eden space 312 and/or the from-space 314 to the to-space 316, shown in FIG. 5C. The portions of the Eden space 312 and/or the from-space 314 storing data for unreachable objects may be released to be used for new created objects shown in FIG. 5D. The from-space 314 becomes the new to-space and the to-space 316 becomes the new from-space for the next garbage collection process.

Figure 5E:
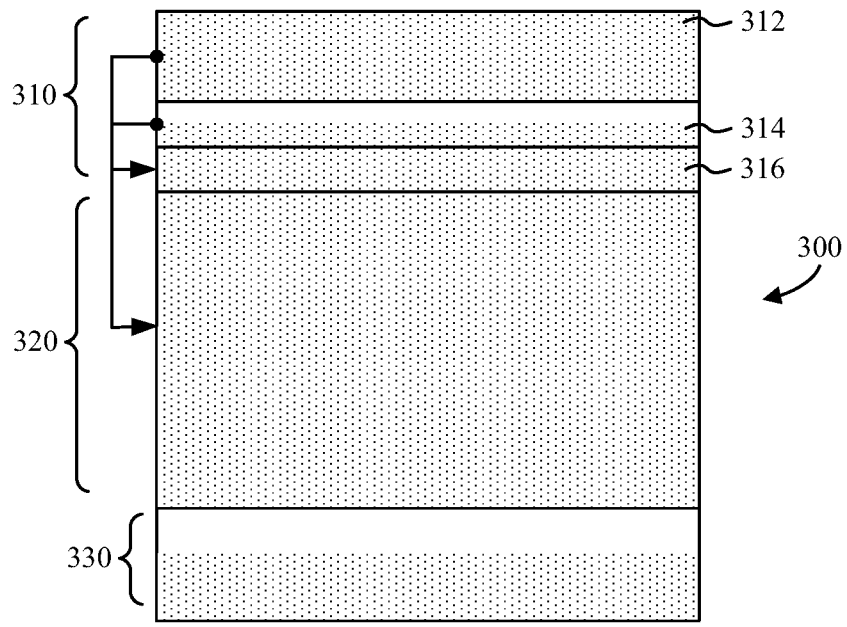
FIG. 5E is a block diagram of the heap of FIG. 5A depicting an allocation of objects from an Eden space and the from-space to a to-space and overflowing to the second generation.
Figure 5F:
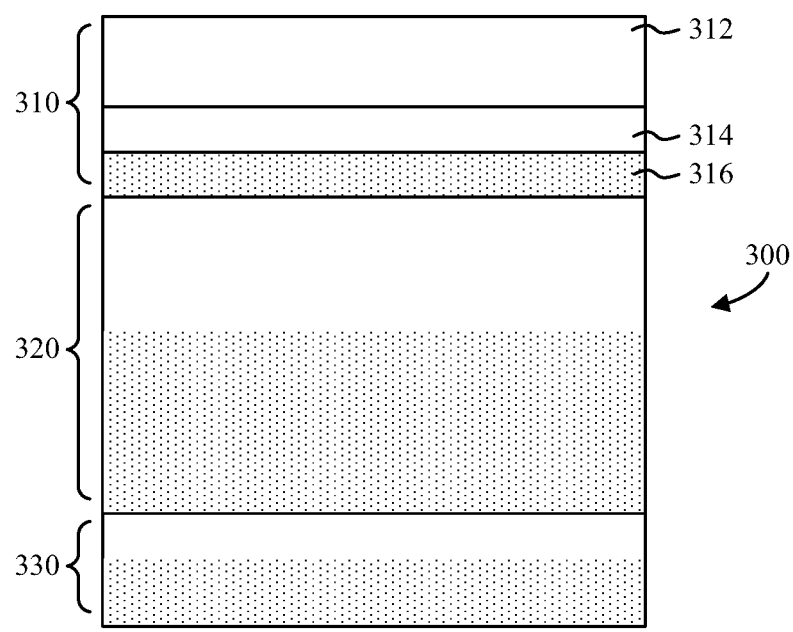
FIG. 5F is a block diagram of the heap of FIG. 5A depicting emptied Eden space and from-space after garbage collection.

In some instances, when the garbage collection occurs for the first generation 310, if the to-space 316 is filled and additional surviving objects remain in the Eden space 312 and/or the from-space 314, then the surviving objects may be transferred to the second generation 320. FIG. 5E depicts the allocation of objects from the Eden space 312 and the from-space 314 to the to-space 316 and overflowing to the second generation 320. Once the objects from the Eden space 312 and from-space 314 have been transferred to the to-space 316 and/or the second generation 320, then the portions of the Eden space 312 and the from space 314 may be released for allocation for data for new objects, as shown in FIG. 5F. The from-space 314 becomes the new to-space and the to-space 316 becomes the new from-space for the next garbage collection process.

Figure 5G:
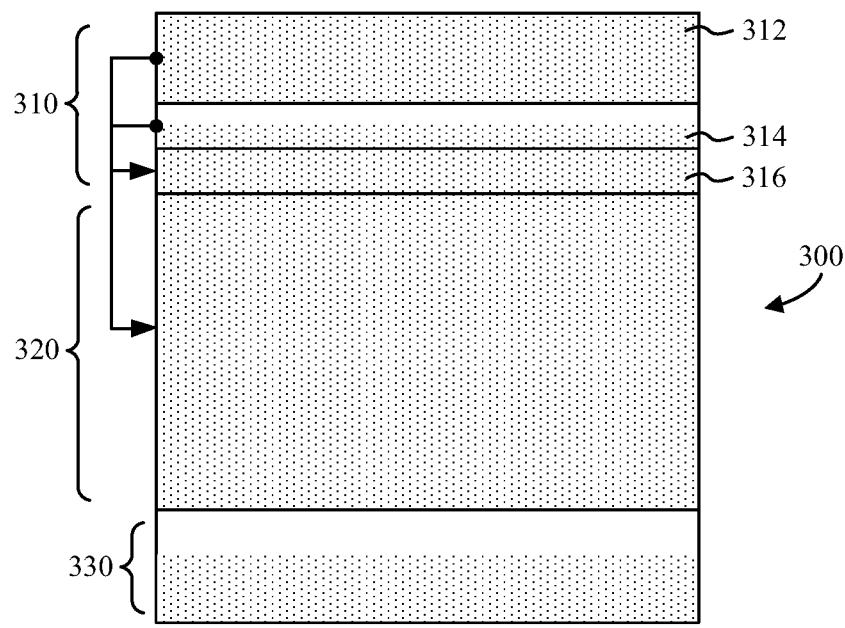
FIG. 5G is a block diagram of the heap of FIG. 5A depicting an example of the to-space and the second generation overflowing.

If all or a predetermined portion of the total space in the second generation 320 has been allocated for objects and additional data for objects from the Eden space 312 and/or the from-space 314 are to be allocated to the second generation 320, then a garbage collection process may occur for the second generation 320. For example, the garbage collection for the second generation 320 may be a mark and sweep garbage collection to release any portions of the second generation 320 having unreachable objects such that the portions may be used for the data of the additional object from the Eden space 312 and/or the from-space 314. If the garbage collection process for the second generation 320 releases sufficient portions of the second generation 320 to store the data for the additional objects from the Eden space 312 and/or the from-space 314, then the Eden space 312 and the from-space 314 of the first generation 310 are released for new objects to be allocated. The from-space 314 becomes the new to-space and the to-space 316 becomes the new from-space for the next garbage collection process. If, for example, the garbage collection process does not release sufficient portions of the second generation 320 to store the data for the additional objects from Eden space 312 and/or the from-space 314 as shown in FIG. 5G, then an overflow error may occur (e.g., an Out of Memory error).

As can be appreciated, the garbage collection processes on the first generation 310 and/or the second generation 320 may require stoppage of the processing of threads to shift the allocated portions of memory for the objects and update the memory address references for the allocated portions of the heap 300. That is, for a garbage collection process to occur, all program execution must be halted during the move-and-update of the objects. Such stop-the-world times may become very lengthy for large heaps 300. For some systems, such as a website hosting server, threads may continually be requested to process page requests, even during the garbage collection processes. Such threads are queued to be processed once the garbage collection process ceases because the system cannot process the threads during the garbage collection process. As a result, an increased response time for the queued threads may delay the response to the request from the server (e.g., a delay of milliseconds to 10, 15, seconds depending on the heap size and number of surviving objects), potentially diminishing a user's experience by not having a website load quickly or other response from the server. Of course, it should be understood that the website hosting server is merely an example.

To lessen such delays and/or reduce the frequency of the delays due to garbage collection, it may be useful to allocate and release portions of the heap for each processing thread. That is, threads may allocate the objects they need in disjunctive blocks of memory called "segments." In addition, threads may be configured to garbage collect their segments at the end of each request processing cycle. That is, the garbage of each individual thread is separate, and each thread collects its own garbage. An advantage of this approach is that each thread can collect its own garbage after processing one request without interfering with the other threads. Thus, minimal additional processing effort is added for each request while reducing the frequency of stop-the-world times. In addition, as will be described in greater detail below, such memory management may support budgets for the number of segments that may be allocated for each thread. If a thread exceeds the allowed number of segments budgeted, the thread may be terminated. This may prevent the thread from crashing other threads or, in the case of Java®, the entire Java® Virtual Machine.

Figure 6:
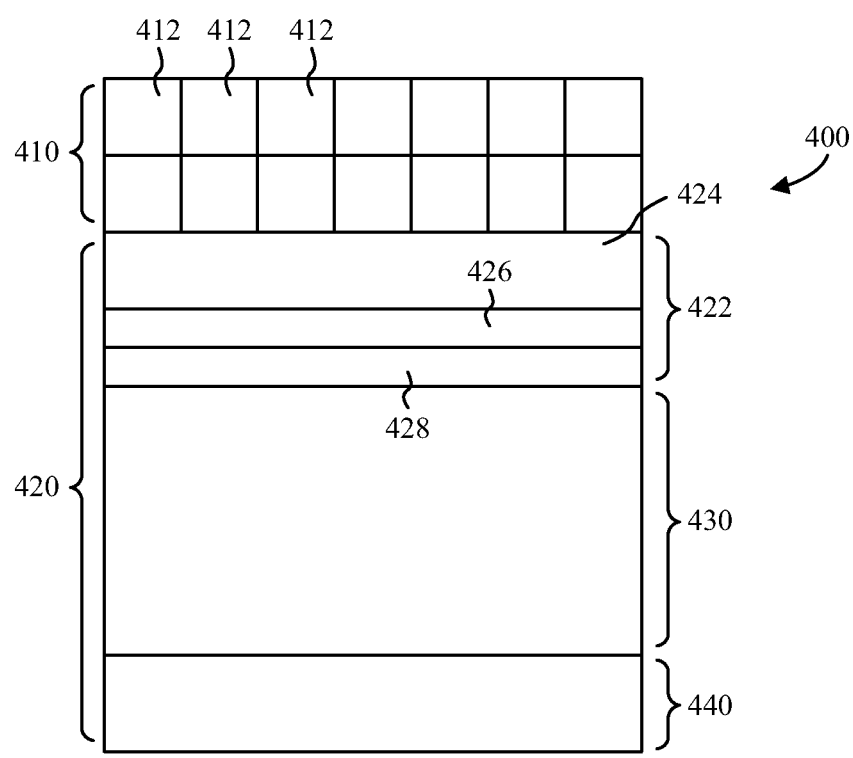
FIG. 6 is a block diagram depicting an example heap having a Region A with several segments and a Region B with several generations.

To accomplish the foregoing, the memory layout, such as that of the Java® Virtual Machine, may be modified as shown in FIG. 6. FIG. 6 is a block diagram depicting an example heap 400 having a Region A 410 with several segments 412 and a Region B 420 with several generations. In example, Region A 410 has all four highest address bits set and memory of Region B 420 does not. Region B 420 in the present example may include a first generation 422, a second generation 430, and a third generation 440. The first generation 422 may be further subdivided into an Eden space 424, a from-space 426, and a to-space 428. The first generation 422, Eden space 424, from-space 426, to-space 428, second generation 430, and third generation 440 may be similar to the first generation 310, Eden space 312, from-space 314, to-space 316, second generation 320, and third generation 330 described above in reference to FIGS. 5A-5G. In some instances, a default Java® heap layout may be used for Region B 420.

Region A 410 includes a space of the heap 400 that is subdivided into several segments 412. The segments 412 may be evenly sized portions of the memory for storing data for objects or the segments may be of varying sizes. In the present example, the segments 412 are equally sized segments 412. The size of the segments 412 may be a size that is a power of 2 (e.g., $2^{nth}$ size). In some instances, Region A 410 may be the portion of the heap 400 having the four highest address bit set.

When a request is received, such as a user request for data from a website hosting server, a processing thread, such as a worker thread, may be activated from a pool of inactive threads and assigned to the request. The processing thread may be allocated one or more segments 412 to be utilized for storing data for the objects utilized by the thread. Objects allocated by the processing thread are allocated in the thread's segments 412 in a stack-like fashion. The processing thread may receive additional segments 412 if one segment 412 is not sufficient to hold all objects of the thread. In some instances, the processing thread may receive multiple segments 412 if an object is allocated that is larger than one segment 412. If no more free segments 412 are available, then a garbage collection for the thread may be forced (e.g., survivor objects may be evacuated to the Eden space 424 in Region B 420, as will be described in greater detail below). If still no segment 412 is free after the garbage collection, then the object may be allocated in Region B 420. In some instances, a maximum number of segments 412 may be defined to limit a thread's memory budget.

When the processing thread is finished, a garbage collection process occurs for the one or more segments 412 that were allocated for the processing thread. The garbage collection process may be a mark and sweep garbage collection, a copying collection, and/or any other garbage collection process. The garbage collection process may move any data for any surviving objects from the one or more segments 412 allocated for the processing thread in Region A 410 to Region B 420, such as to the Eden space 424. The portions of the memory for the one or more segments 412 may then be released to be used by other processing threads. Thus, a processing thread may not interfere with other processing threads during the processing thread's garbage collection process as each processing thread is allocated one or more non-overlapping segments 412. By automatically performing garbage collection processes at the termination of a processing thread, the halting of other processing of other threads may be avoided or reduced while permitting the release of portions of the memory for the heap 400 for other processing threads.

Figure 7A:
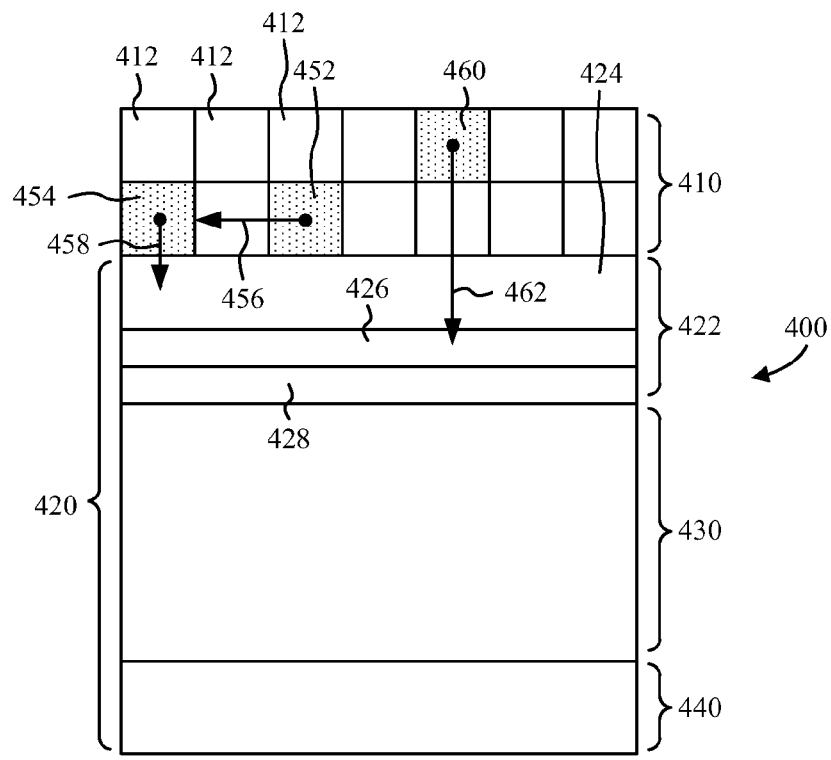
FIG. 7A is a block diagram of the heap of FIG. 6 depicting example segments allocated to threads and references from objects in the segments to objects in other segments or to objects in the Region B.

FIG. 7A is a block diagram of the heap 400 of FIG. 6 showing examples of segments 452, 454, 460 being allocated and utilized for two different processing threads. In a first example, segments 452 and 454 have been allocated to a first processing thread. The first processing thread can allocate portions of the memory in the segments 452, 454 for objects used by the processing thread. As shown in FIG. 7A, the first segment 452 includes a first reference 456 to an object having data stored in the second segment 454. In addition, the second segment 454 includes a second reference 458 to an object having data stored in Region B 420. The first reference 456 and the second reference 458 are considered uncritical references as they refer either to another segment allocated to the processing thread (e.g., the first reference 456) or to Region B 420 (e.g., the second reference 458). The second processing thread has a single segment 460 allocated for storing the data for objects used by the second processing thread. The segment 460 of the second processing thread also has a reference 462 to an object having data stored in Region B 420.

Figure 7B:
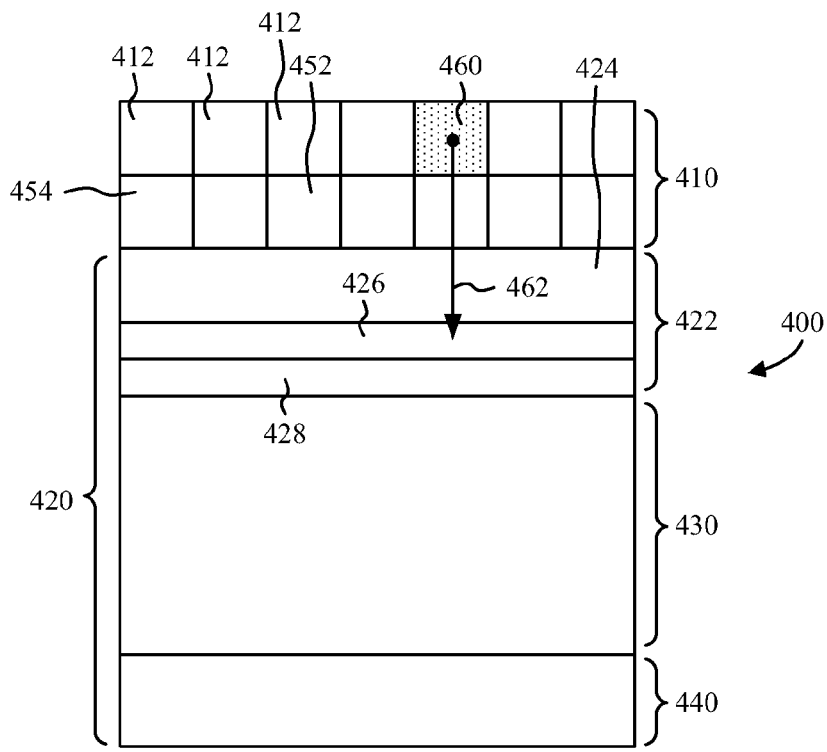
FIG. 7B is a block diagram of the heap of FIG. 7A depicting emptied segments of an example thread after completion of the thread and garbage collection performed by the thread on the segments.

When the first processing thread performs a garbage collection process, such as at the termination of the first processing thread, the allocated portions of the segments 452, 454 may be released and the segments 452, 454 may also be released to be used by another processing thread. For example, FIG. 7B shows the emptied segments 452, 454 after completion of the processing thread and the garbage collection process has been performed. The segment 460 allocated for the second processing thread remains allocated to the second processing thread and is not disrupted by the garbage collection process performed by the first processing thread on the segments 452, 454 allocated for the first processing thread.

As may be appreciated, the portions of the heap 400 for Region A 410 may continually be allocated to a processing thread, used to store data for the processing thread, have a garbage collection process performed by the processing thread, and then released to be allocated again. For processing threads that do not require the allocation of large portions of the heap 400 for the objects of the processing thread, the use of the segments 412 in Region A 410 may be sufficient without storing data for objects in Region B 420. Thus, the garbage collection processes that may occur for Region B 420 may be reduced in time and/or may occur less frequently. That is, as less objects are allocated in the Eden space 424 of Region B 420, less garbage is also created in the Eden space 424. As a result, the garbage collection processes for the first generation 422 run less frequently. As the garbage collection processes for the first generation 422 run less frequently, fewer objects can be expected to be promoted to the second generation 430. This leads to fewer garbage collection processes for the second generation 430 collection runs less frequently. As the garbage collection processes for the second generation 430 run less frequently, the stop-the-world times are reduced and may be less impactful, potentially permitting an application being executed may run more smoothly.

Figure 8:
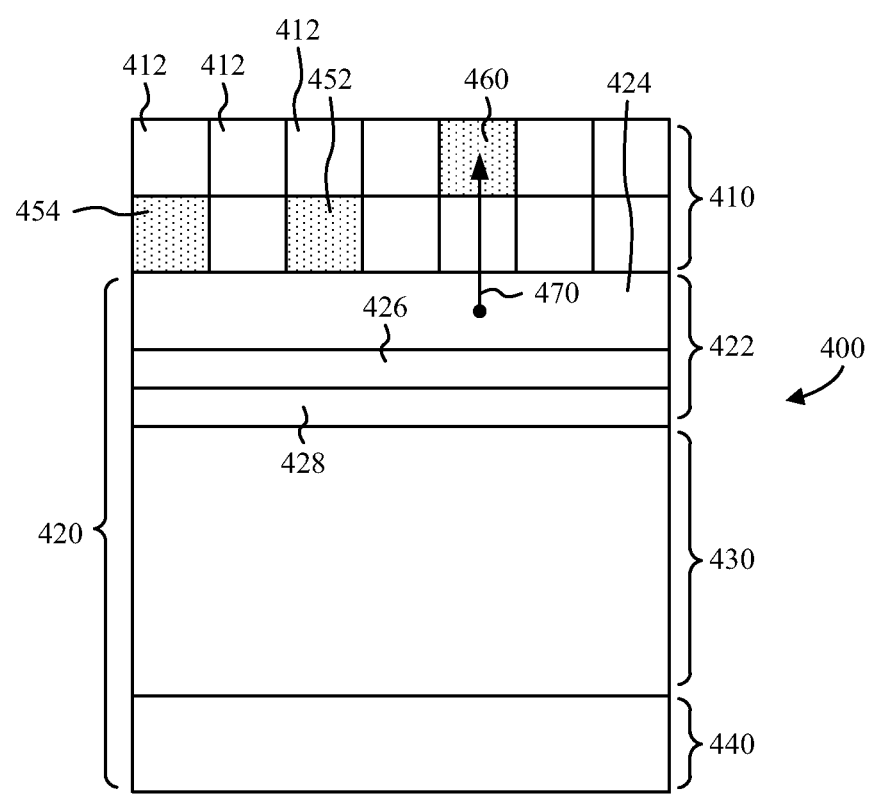
FIG. 8 is a block diagram of the heap of FIG. 6 depicting an example reference from Region B to an object in a segment in Region A that violates an example condition.

To maintain efficiency for the garbage collection processes that the processing threads perform on the segments 412 at the end of the threads' processing, a condition that objects allocated in Region B 420 do not reference objects allocated in Region A 410 may be used. That is, all references from objects in a thread's segments refer either to other objects in the thread's segments or to objects in Region B 420. A reference from an object having data stored in Region B 420 to an object having data stored in Region A 410 may be considered a critical reference. FIG. 8 is a block diagram of the heap 400 of FIG. 6 depicting an example critical reference 470 from Region B 420 to the data for an object stored in a segment 460 in Region A 410 that violates the condition. Using such a condition, the processing thread can efficiently identify the survivors in the allocated segments when the processing thread is performing the garbage collection process. The processing thread may identify the root objects in the allocated segments and determine any other reachable objects in the segments (e.g., by walking the reference graph). During the garbage collection process, such as a copying collection process performed by a copying collector, the processing thread may copy the data for the reachable objects to an allocated portion in Region B 420, such as the Eden space 424. Once the surviving objects have been transferred to Region B 420, the segments may be released and the thread may go back to sleep.

Figure 9:
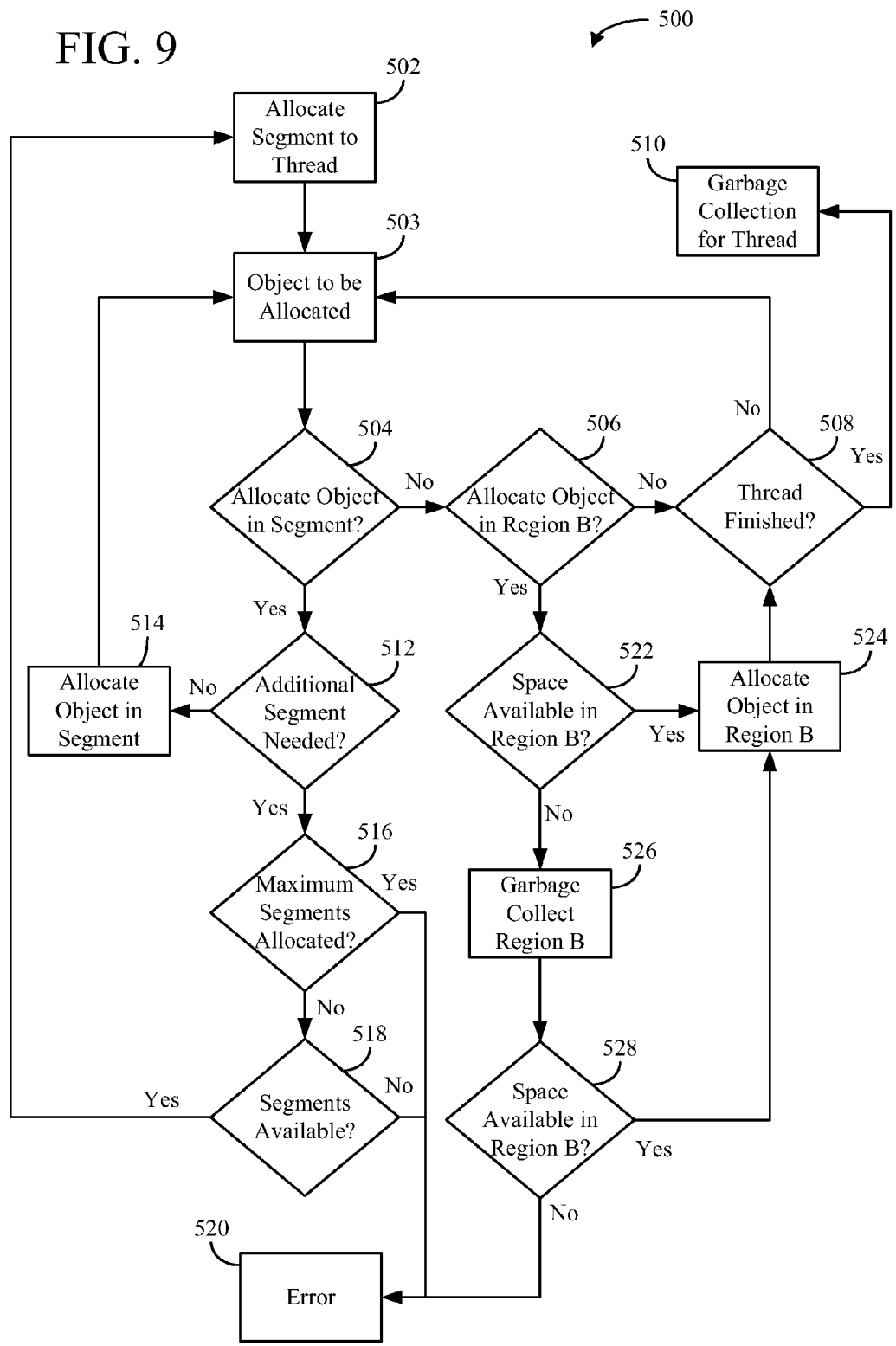
FIG. 9 is a process diagram of an example process for allocating segments and objects for a thread having a maximum segment limit.

FIG. 9 is a process diagram of an example process 500 for allocating segments, such as segments 412, to store data for objects of a processing thread. In the present example, the process 500 includes a limit on the number of segments that may be allocated for a single processing thread. Such a limit may be useful to prevent a processing thread from using too many segments and/or using too much memory. In the present example, when a processing thread is activated, a segment for the processing thread may be allocated (block 502). Segments may be identified in a linked list. Allocating a segment may include retrieving the first element, i.e. a reference to the segment, in the list and removing the reference from the list. When a segment is released or freed, the processing thread appends the reference to the segment to the segment linked list.

The process 500 may wait until an object is to be allocated (block 503). For example, if the processing thread is performing other tasks, the process 500 may simply loop back to block 503 until an object is to be allocated. Once an object is to be allocated, a determination may be made whether an object is to be allocated in a segment for the processing thread (block 504). If no object needs to be allocated in a segment, a determination may be made whether an object is to be allocated in Region B for the processing thread (block 506). If no object needs to be allocated in Region B either, then a determination may be made whether the thread has finished (block 508). If the thread has finished, then a garbage collection process may be performed by the processing thread on the segment or segments allocated to the thread (block 510). The garbage collection process may be a mark and sweep process, such as that described in reference to FIGS. 3A-3C, a copying collection process, such as that described in reference to FIGS. 4A-4C, or any other garbage collection process. In the instance of a copying collection process, the data for the surviving objects may be copied from the segment to a portion allocated in Region B, such as the Eden space, from-space, to-space, or second generation. At the end of the garbage collection process, the processing thread may then release the segment or segments allocated to the processing thread to be used by other processing threads and end.

If the determination is made that the thread is not finished (block 508), then the process 500 may return to determine whether an object is to be allocated in a segment for the processing thread (block 504). If an object is to be allocated in a segment for the processing thread (block 504), then a determination may be made whether an additional segment is needed or if there is space in the current segment or segments to store the data for the object (block 512). The data for objects allocated by the processing thread may be allocated in the thread's segments in a stack-like fashion. If it is determined that the data for the object may be allocated in the current segment, then the portion of the segment may be allocated for the object and the data for the object may be stored (block 514). The process 500 then returns to determine whether another object is to be allocated in a segment for the processing thread (block 504).

If it is determined that an additional segment is needed (block 512), then a determination may be made whether the processing thread has been allocated the maximum segments (block 516). As noted above, such a limit may be useful to prevent a processing thread from using too many segments and/or using too much memory (e.g., if the processing thread will have an infinite loop allocating objects, the processing thread may end up having every segment allocated to the processing thread and eventually resulting in an error by allocating all the free memory for the infinitely created objects). In some implementations, the maximum number of segments may be manually set or otherwise defined to limit thread memory budget. In one implementation, the maximum number of segments may be set as 10 segments. In other examples, the maximum number of segments may be associated with a byte size, such as 10 megabytes, 30 megabytes, etc. If the maximum number of segments has not been reached, then a determination may be made whether another segment is available in Region A to be allocated for the processing thread (block 518). If there are segments available in Region A, then the process 500 allocates the additional segment for the processing thread (block 502).

If no segments are available in Region A (block 518) or the maximum segments have been allocated for the processing thread (block 516), then the process 500 ends with an error (block 520), such as an Out of Memory error.

If it is determined that an object is to be allocated in Region B for the processing thread (block 506), then the process 500 may proceed to determine whether there is sufficient space available in Region B to store the data for the new object (block 522). If it is determined that there is sufficient space available in Region B (block 522), then the process 500 allocates the object in region B (block 524) and then determines if the processing thread is finished (block 508).

If it is determined that there is insufficient space available in Region B (block 522), then the process 500 may initiate a garbage collection process for Region B (block 526). In some implementations, the garbage collection process for Region B may include an initial garbage collection process for the first generation space, such as the Eden space, from-space, and to-space. The garbage collection process may be a mark and sweep process, such as that described in reference to FIGS. 3A-3C, a copying collection process, such as that described in reference to FIGS. 4A-4C, or any other garbage collection process. If there is insufficient space available in the first generation portion of Region B after the garbage collection process, then a garbage collection process may occur for the second generation. The garbage collection process may also be a mark and sweep process, such as that described in reference to FIGS. 3A-3C, a copying collection process, such as that described in reference to FIGS. 4A-4C, or any other garbage collection process. In other implementations, a single garbage collection process may be performed for the first and second generations in Region B.

A determination may be made whether there is sufficient space available in Region B after the garbage collection process for Region B (block 528). If it is determined that there is sufficient space available in Region B (block 528), then the process 500 allocates the object in Region B (block 524) and determines if the processing thread is finished (block 508). If it is determined that there is insufficient space available in Region B after the garbage collection process (block 528), then the process 500 may end with an error (block 520), such as an Out of Memory error.

Figure 10:
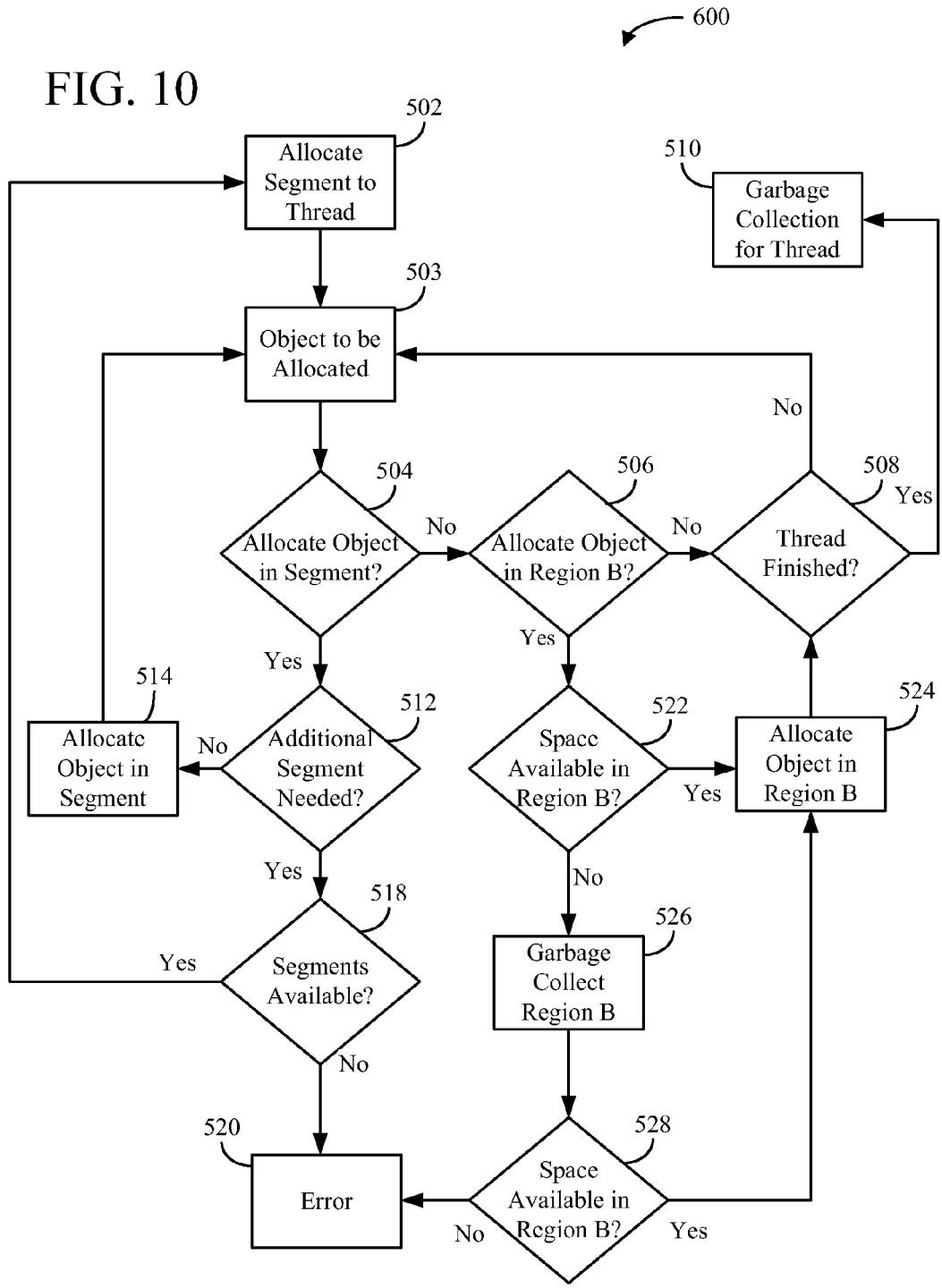
FIG. 10 is a process diagram of an example process for allocating segments and objects for a thread without a maximum segment limit.

FIG. 10 is a process diagram of another example process 600 for allocating segments, such as segments 412, to store data for objects of a processing thread. In the present example, the process 600 does not include a limit on the number of segments that may be allocated for a single processing thread. The process 600 may operate in a similar manner to process 500, except the determination of whether the processing thread has been allocated the maximum segments (block 516) of FIG. 9 is omitted.

Figure 11:
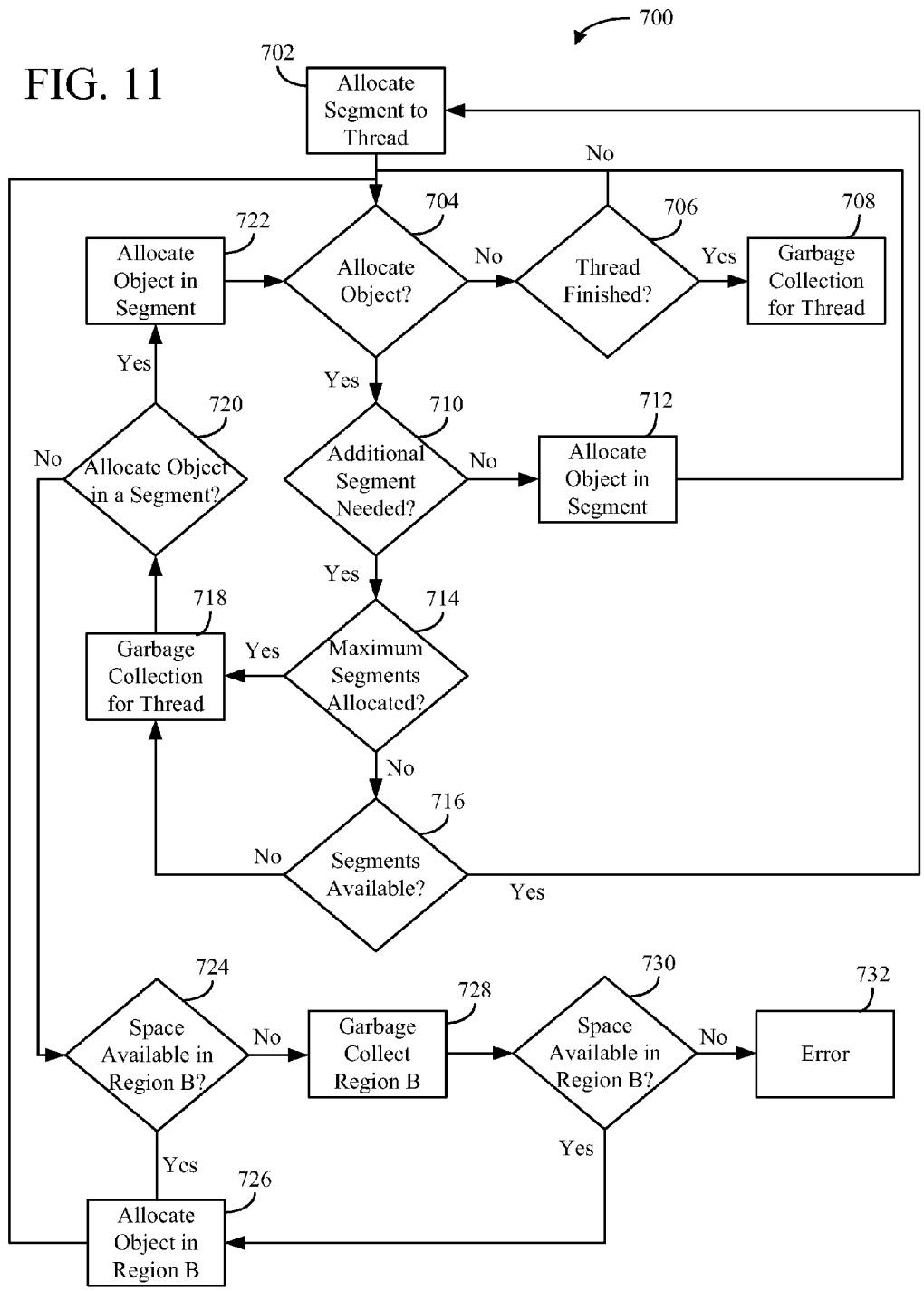
FIG. 11 is a process diagram of another example process for allocating segments and objects for a thread having a maximum segment limit.

FIG. 11 is another process diagram of an example process 700 for allocating segments, such as segments 412, to store data for objects of a processing thread. In the present example, the process 700 includes a limit on the number of segments that may be allocated for a single processing thread. Such a limit may be useful to prevent a processing thread from using too many segments and/or using too much memory. In the present example, when a processing thread is activated, a segment for the processing thread may be allocated (block 702). A determination may be made whether a portion of the heap needs to be allocated for an object for the processing thread (block 704). If no portion needs to be allocated for the object, a determination may be made whether the thread has finished (block 706). If the thread has finished, then a garbage collection process may be performed by the processing thread on the segment or segments allocated to the thread (block 708). The garbage collection process may be a mark and sweep process, such as that described in reference to FIGS. 3A-3C, a copying collection process, such as that described in reference to FIGS. 4A-4C, or any other garbage collection process. In the instance of a copying collection process, the data for the surviving objects may be copied from the segment to a portion allocated in Region B, such as the Eden space, from-space, to-space, or second generation. At the end of the garbage collection process, the processing thread may then release the segment or segments allocated to the processing thread to be used by other processing threads.

If the determination is made that the thread is not finished (block 706), then the process 700 may return to determine whether a portion of the heap needs to be allocated for an object for the processing thread (block 704). If a portion of the heap needs to be allocated for an object for the processing thread (block 704), then a determination may be made whether an additional segment is needed or if there is space in the current segment or segments to store the data for the object (block 710). The data for objects allocated by the processing thread may be allocated in the thread's segments in a stack-like fashion. If it is determined that the data for the object may be allocated in the current segment, then the portion of the segment may be allocated for the object and the data for the object may be stored (block 712). The process 700 then returns to determine whether a portion of the heap needs to be allocated for another object for the processing thread (block 704).

If it is determined that an additional segment is needed, then a determination may be made whether the processing thread has been allocated the maximum segments (block 714). As noted above, such a limit may be useful to prevent a processing thread from using too many segments and/or using too much memory (e.g., if the processing thread will have an infinite loop allocating objects, the processing thread may end up having every segment allocated to the processing thread and eventually resulting in an error by allocating all the free memory for the infinitely created objects). In some implementations, the maximum number of segments may be manually set or otherwise defined to limit thread memory budget. In one implementation, the maximum number of segments may be set as 10 segments. In other examples, the maximum number of segments may be associated with a byte size, such as 10 megabytes, 30 megabytes, etc. If the maximum number of segments has not been reached, then a determination may be made whether another segment is available in Region A to be allocated for the processing thread (block 716). If there are segments available in Region A, then the process 700 allocates the additional segment for the processing thread (block 702).

If no segments are available in Region A (block 716) or the maximum segments have been allocated for the processing thread (block 714), then the process 700 proceeds to performing a garbage collection process for the thread without releasing the segment or segments allocated for the processing thread (block 718). The garbage collection process may be a mark and sweep process, such as that described in reference to FIGS. 3A-3C, a copying collection process, such as that described in reference to FIGS. 4A-4C, or any other garbage collection process. In the instance of a copying collection process, the data for the surviving objects may be copied from the segment to a portion allocated in Region B, such as the Eden space, from-space, to-space, or second generation.

After the garbage collection process for the thread (block 718), a determination may be made whether the data for the object may be allocated in the current segment or segments (block 720). For example, if many of the objects already stored in the segment or segments are unreachable (e.g., garbage), then the garbage collection process may release a sufficient portion of the segment or segments to be allocated for the new object. In such an instance, the process 700 proceeds to allocate the object in the segment or segments (block 722). If many of the objects already stored in the segment or segments are reachable (e.g., survivor objects), then the garbage collection process may not release a sufficient portion for allocating the object in the current segment or segments. The process 700 may proceed to determine whether there is sufficient space available in Region B to store the data for the new object (block 724). In the instance of a copying collection process being performed on the segment or segments for the processing thread during the garbage collection process (block 718), the survivor objects may be transferred or attempted to be transferred to Region B. In such an instance, the process 700 may proceed to determining whether there is sufficient space available in Region B to store the data for the survivor objects and/or the new object. If it is determined that there is sufficient space available in Region B (block 724), then the process 700 allocates the object in Region B (block 726) and then returns to determine whether a portion of the heap needs to be allocated for another object for the processing thread (block 704).

If it is determined that there is insufficient space available in Region B (block 724), then the process 700 may initiate a garbage collection process for Region B (block 728). In some implementations, the garbage collection process for Region B may include an initial garbage collection process for the first generation space, such as the Eden space, from-space, and to-space. The garbage collection process may be a mark and sweep process, such as that described in reference to FIGS. 3A-3C, a copying collection process, such as that described in reference to FIGS. 4A-4C, or any other garbage collection process. If there is insufficient space available in the first generation portion of Region B after the garbage collection process, then a garbage collection process may occur for the second generation. The garbage collection process may also be a mark and sweep process, such as that described in reference to FIGS. 3A-3C, a copying collection process, such as that described in reference to FIGS. 4A-4C, or any other garbage collection process. In other implementations, a single garbage collection process may be performed for the first and second generations in Region B.

A determination may be made whether there is sufficient space available in Region B after the garbage collection process for Region B (block 730). If it is determined that there is sufficient space available in Region B (block 730), then the process 700 allocates the object in Region B (block 726) and then returns to determine whether a portion of the heap needs to be allocated for another object for the processing thread (block 704). If it is determined that there is insufficient space available in Region B after the garbage collection process, then the process 700 may end with an error (block 732), such as an Out of Memory error.

Figure 12:
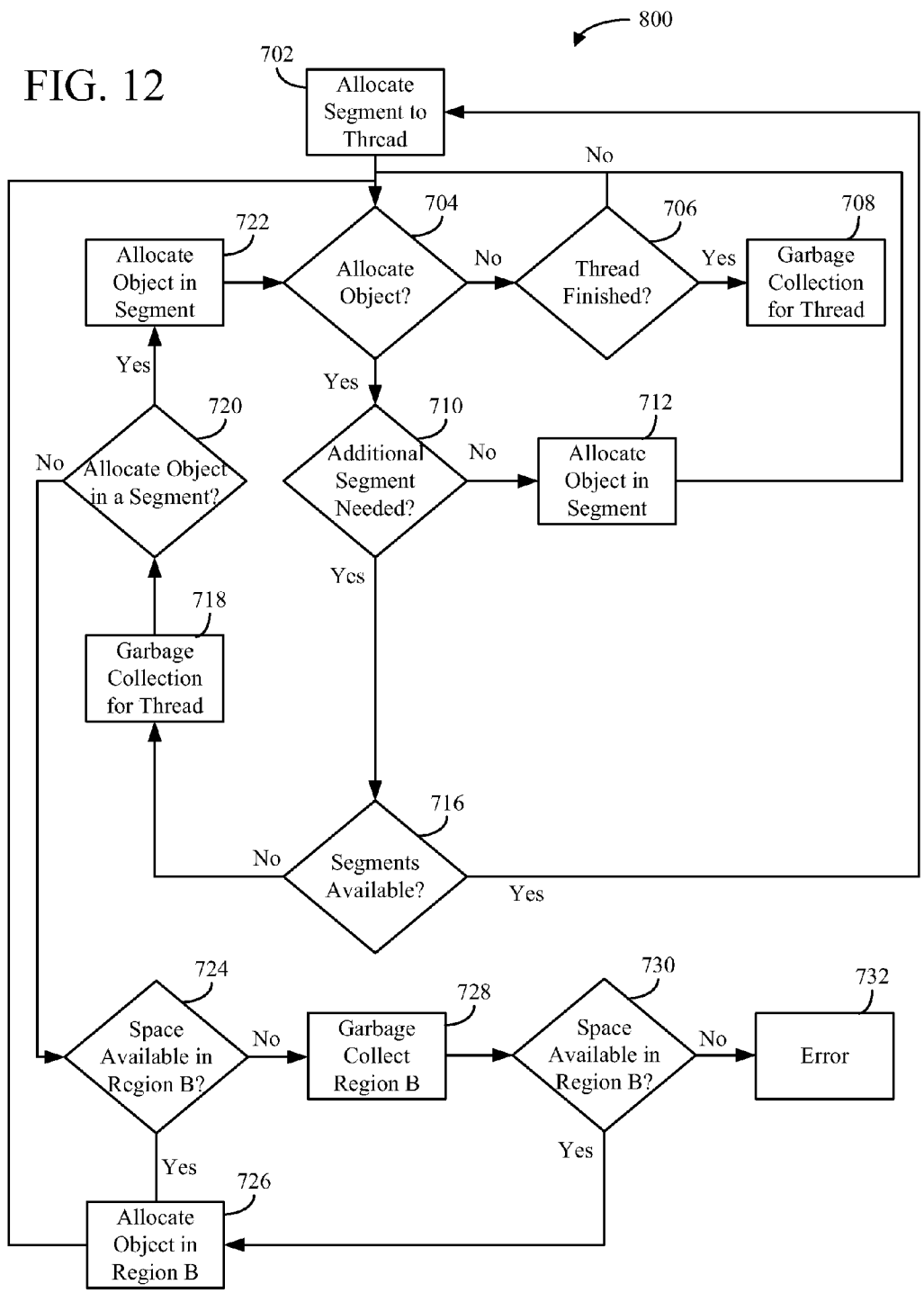
FIG. 12 is a process diagram of another example process for allocating segments and objects for a thread without a maximum segment limit.

FIG. 12 is a process diagram of another example process 800 for allocating segments, such as segments 412, to store data for objects of a processing thread. In the present example, the process 800 does not include a limit on the number of segments that may be allocated for a single processing thread. The process 800 may operate in a similar manner to process 700, except the determination of whether the processing thread has been allocated the maximum segments (block 714) of FIG. 11 is omitted.

Figure 13:
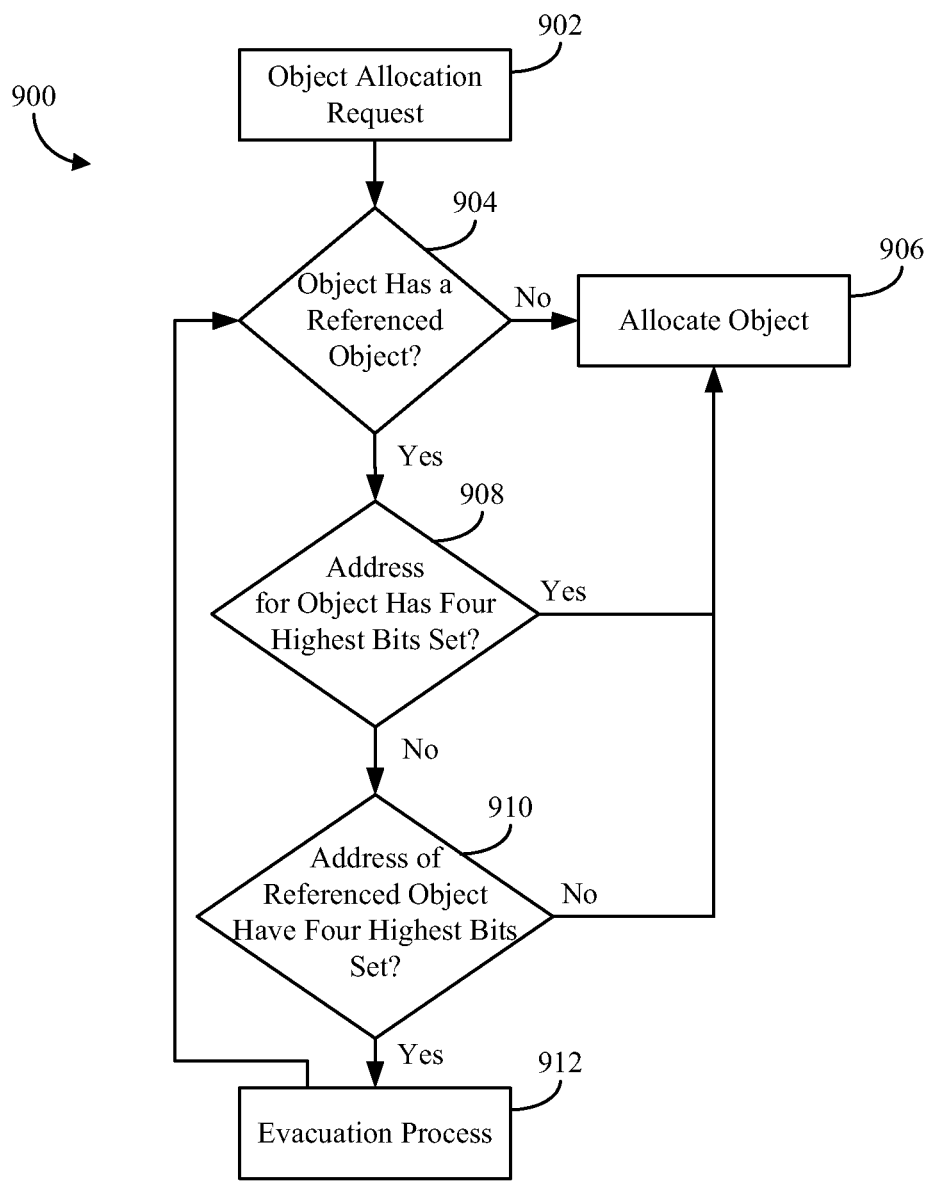
FIG. 13 is a process diagram of an example process for enforcing the example condition when an object is to be allocated to Region B.

FIG. 13 is a process diagram of an example process 900 for enforcing the example condition described above for critical references when an object is to be allocated. A reference that references from an object having data stored in Region B to an object having data stored in Region A may be considered a critical reference. During program execution the only way the condition can be violated is if a thread modifies a reference of an object in Region B such that it refers to an object in one of the thread's segments. If setting a reference to an object would violate the condition, then process 900 may be performed to move the object in a segment of the thread from the segment and into Region B. The process 900 may occur anytime an object is to be allocated, either a newly created object or a transferred object as a result of garbage collection process. In the example shown, the process 900 begins when an object is to be allocated (block 902) (e.g., the reference to the location of memory where the data for the object is to be set). A determination may be made whether the object being allocated references another object (i.e., a referenced object) (block 904). If it is determined that the object does not reference another object (block 904), then the data for the object can be allocated at the memory address (block 906).

If it is determined that the object does reference another object (block 904), then a determination is made whether the memory address where the object is to be allocated has the four highest bits set (block 908). That is, if the memory address where the object is to be allocated is in a segment in Region A. If it is determined that the memory address where the object is to be allocated does have the four highest bits set (block 908), then the data for the object can be allocated at the memory address (block 906).

If, conversely, it is determined that the memory address where the object is to be allocated does not have the four highest bits set (block 908), then the memory address where the object is to be allocated is in Region B. In such a case, a determination is then made whether the memory addresses of any of the referenced objects do not have the four highest bits set (block 910). That is, if any of the objects referenced by the object to be allocated are in Region A and the object to be allocated will be in Region B. Such a situation would violate the aforementioned condition. The determination may loop for each referenced object memory address to be compared with the four highest bit set. If it is determined that none of the memory addresses of any of the referenced objects have the four highest bits set (block 910) (i.e., all objects referenced by the object to be allocated are in Region B), then the data for the object can be allocated at the memory address (block 906). If a memory address of any of the referenced objects have the four highest bits set (block 910) (i.e., an object referenced by the object to be allocated is in Region A), then an evacuation process may be requested or initiated (block 912). After the evacuation process concludes the process 900 may loop back to determine if the object references another object (block 904).

Figure 14:
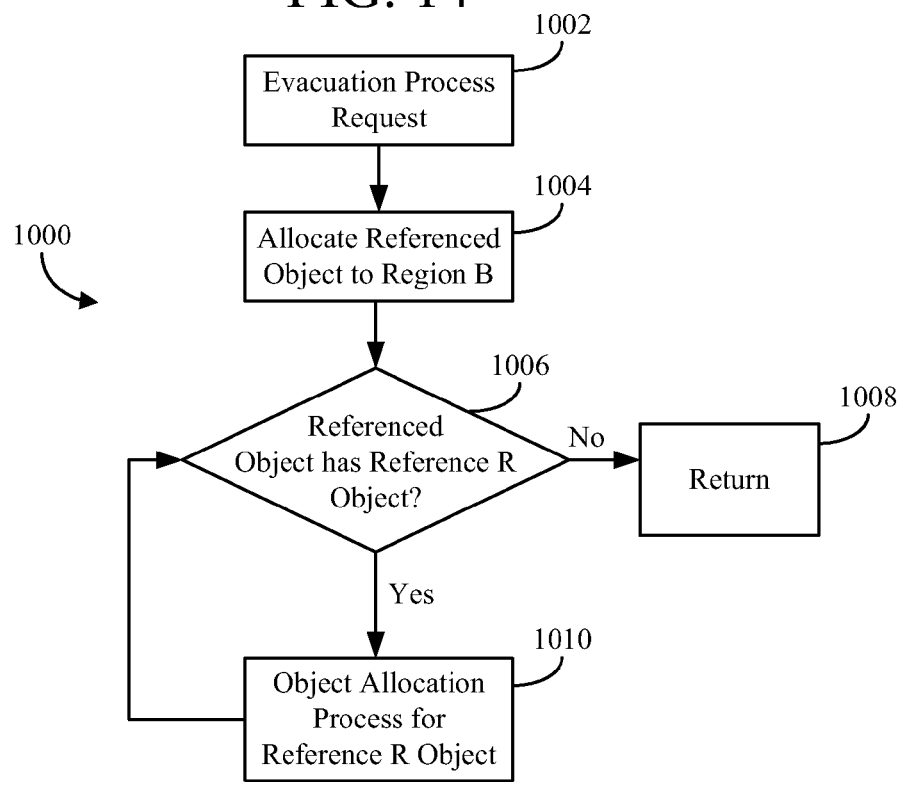
FIG. 14 is a process diagram of an example evacuation process.

In some implementations, the thread causing the violation of the condition may easily detect the violation and repair it. For example, if a thread wants to store an object that is referred to from Region B to the object to be stored, then the thread may check if the store operation would violate the condition using process 900. Such a check may be performed by looking at the memory address of the object referencing the object to be stored and the address where the object is to be stored. In one example implementation, such a process 900 may be summarized as:

1) If the memory address of object r has the four highest bits set (e.g., object r is located in Region A) then Goto 4
2) If the memory address of object o (the memory address object r is referring to) does not have the four highest bits set (e.g., object o is located in Region B) then Goto 4
3) Else call the evacuation routine for object o and setting the memory address for object r to the new reference for object o
4) Store the reference for the object r FIG. 14 is a process diagram of an example evacuation process 1000 that may be used when an object is to be allocated in Region B (such as through a garbage collection process or when created by the processing thread) and the object references another object that is allocated in Region A. The evacuation process 1000 may begin with an evacuation process request (block 1002). The evacuation process request may occur at the conclusion of process 900. The data for the referenced object that is allocated in Region A may be copied to an allocated portion in Region B (block 1004). The referenced object may be allocated to an Eden space, a from-space, a to-space, a second generation, or any other portion of Region B. A determination is then made whether the referenced object references further objects (reference R objects for clarity purposes) (block 1006). If the referenced object does not have any further referenced objects the evacuation process 1000 may return to a prior loop or end (block 1008). If the referenced object references further objects, reference R objects, then the object allocation process may be requested for the reference R object (block 1010). That is, after moving the referenced object from Region A to Region B to satisfy the condition discussed above, for any further referenced objects, reference R objects, from the referenced object, the process 900 may be used to determine if the condition would be violated by the further referenced objects. The evacuation process 1000 loops back to the determination (block 1006) for each further referenced object, reference R objects. In one example implementation, such a process 1000 may include the following:

```
Reference evacuate(Reference r) {
    Allocate memory for the object o in Eden, where
        r is the reference referring to o in segments of t
        r' is a reference referring to the newly allocated object in Eden
    Copy the memory for object o from the memory referred to by r to
the new memory referred to by r'
    For each reference R of o (now located at r') {
        If R violates the condition
            Then R = evacuate (R)
    }
    return r'
}
```

By way of example only, an object A may reference an object B which, in turn, references an object C. If object A is to be moved to Region B and objects B and C are allocated in Region A, then the result of process 900 of FIG. 13 may be that object B, the referenced object of object A, violates the condition. Accordingly, the evacuation process 1000 of FIG. 14 may be requested. As the evacuation process 1000 occurs, object B is allocated to Region B (such as the Eden space, from-space, to-space, second generation, etc.) and the result of the determination of whether the referenced object, object B, references further objects (block 1008) is positive due to object C. Thus, the object allocation process 900 may be initiated (block 1010) to determine if object C violates the condition. In this example, because object C also violates the condition, the evacuation process 1000 is once again requested for object C. As the evacuation process 1000 occurs, object C is allocated to Region B (such as the Eden space, from-space, to-space, second generation, etc.) and the result of the determination of whether the referenced object, object C, references further objects (block 1006) is negative. Thus, evacuation process returns to the prior evacuation process for object B. The evacuation process for object B loops back to the determination (block 1006), which then proceeds to return (block 1006) as there are no further referenced objects from object B. The process 900 for object A then loops back to determine whether there are additional referenced objects from object A (block 904). As no additional objects are referenced by object A, the process 900 proceeds to allocate object A in Region B (block 906). Thus, it can be appreciated that the condition is satisfied.

Figure 15:
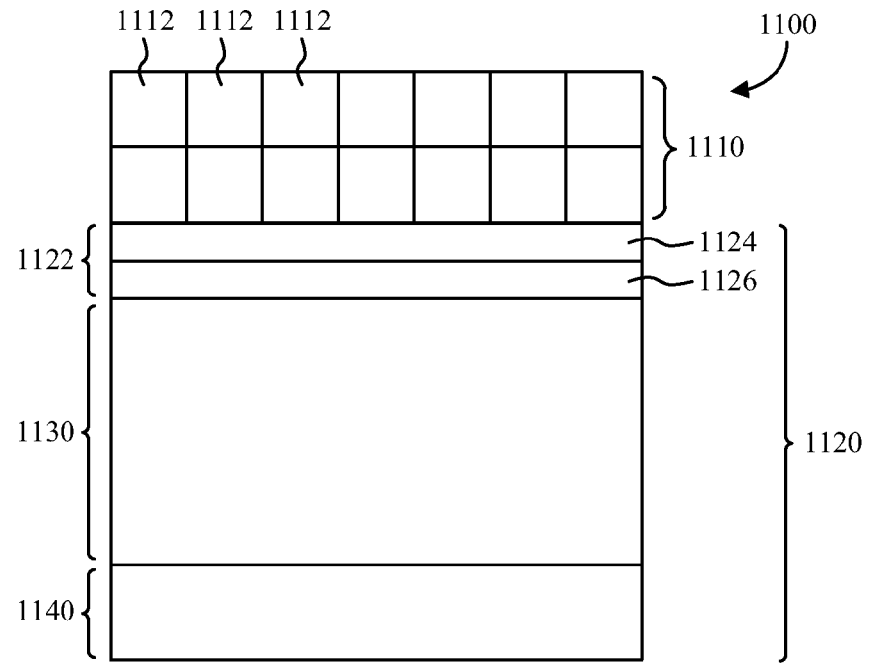
FIG. 15 is a block diagram of another example heap having a Region A with several segments and a Region B with several generations.

FIG. 15 is a block diagram of another example heap 1100. In the present example, the heap 1100 includes a Region A 1110 with several segments 1112 and a Region B 1120 with several generations. Region B includes a first generation 1122, a second generation 1130, and a third generation 1140. The first generation is further subdivided into a from-space 1124 and a to-space 1126. In this example, the Eden space has been omitted. Thus, data for objects from the segments 1112 may be transferred to the from-space 1124 instead of the Eden space. In other implementations, the from-space 1124 may be omitted as well.

In some further implementations, Region A may have a from-space with segments and a to-space with segments. Thus, Region A may be the first generation. Region B may then include a second generation and/or a third generation.

Figure 16:
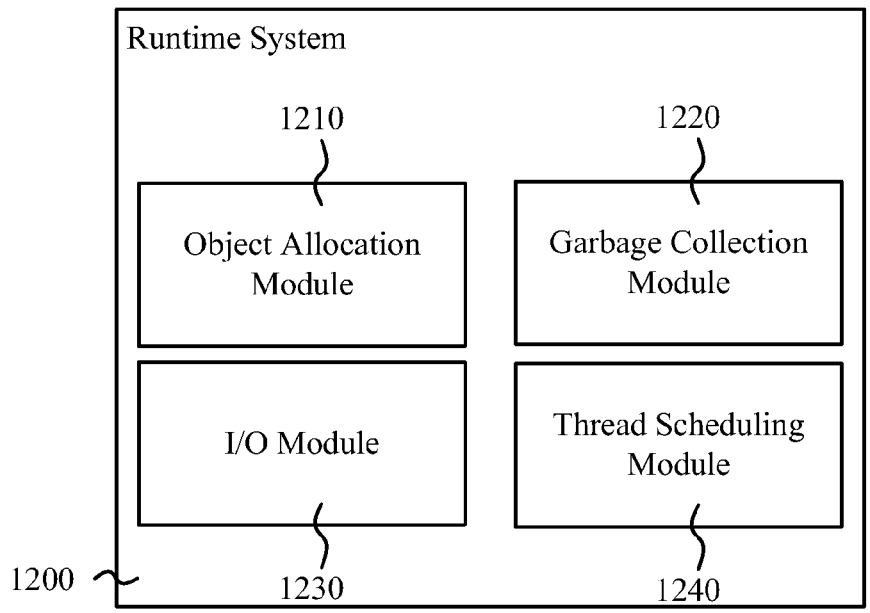
FIG. 16 is a block diagram of an example runtime system.

FIG. 16 depicts a block diagram of an example runtime system 1200 that may be modified to implement the foregoing memory management and/or garbage collection processes. The runtime system 1200 receives program code to be executed. In one example implementation, the runtime system 1200 may be a Java® runtime system, such as Java® Virtual Machine. The runtime system 1200 includes several modules, such as an object allocation module 1210, a garbage collection module 1220, an I/O module 1230, a thread scheduling module 1240, and/or any other modules. The object allocation module 1210 may be configured to allocate objects in a memory of a computing device running the runtime system 1200. The object allocation module 1210 may be configured to perform processes 500, 600, 700, 800, 900, 1000. The garbage collection module 1220 may be configured to perform the garbage collection process, such as a mark and sweep process described in reference to FIGS. 3A-3C, a copying collection process described in reference to FIGS. 4A-4C, or any other garbage collection process. The I/O module 1230 may be configured to receive inputs for the runtime system 1200 and output outputs from the runtime system 1200. The thread scheduling module 1240 may be configured to schedule and/or otherwise organize processing threads to be given access to system resources. Of course other modules may be included in the runtime system 1200.

Additional advantages may be realized by the foregoing described memory management system and/or garbage collection processes. For example, there may be no overhead for other threads caused by stopping the affected thread, evacuation may only affect the thread requiring evacuation, and the stop-the-world times may occur less frequently. The less frequent stop-the-world times may occur because, as fewer objects are allocated in the Eden space, also less garbage is created in the Eden space. Thus, the first generation garbage collections run less frequently. As the first generation garbage collections run less frequently, fewer objects can be expected to be promoted to the second or subsequent generations. Accordingly, fewer older generation garbage collections occur and such older generation garbage collections run less frequently. As the garbage collections run less frequently, the stop-the-world times are reduced and application may run more smoothly and/or with fewer interruptions to the processing threads.

Figure 17:
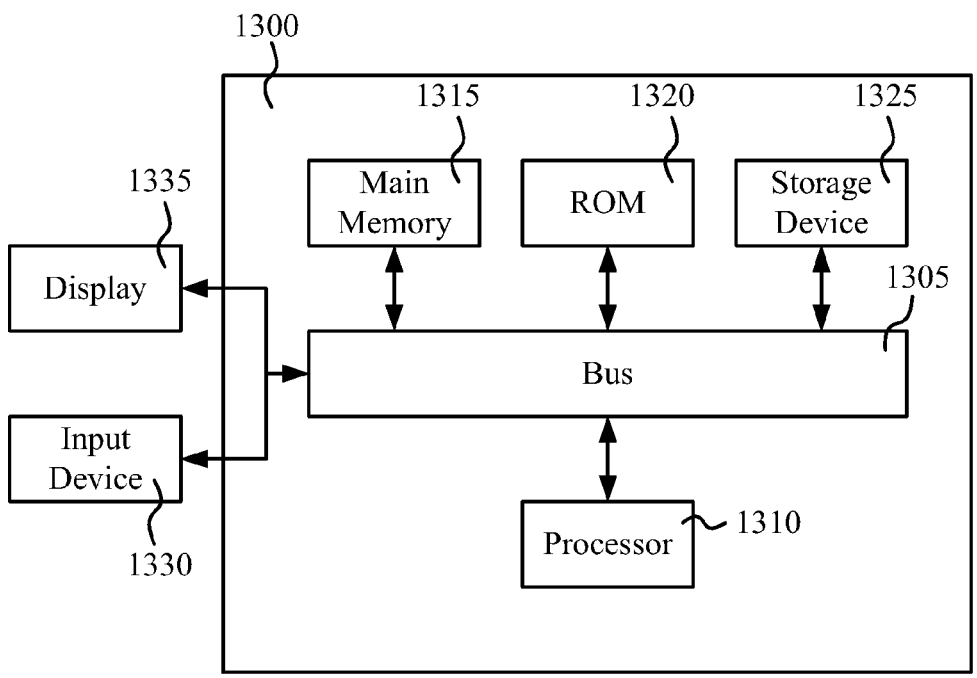
FIG. 17 is a block diagram depicting a general architecture for a computer system that may be employed to implement various aspects described and illustrated herein.

FIG. 17 is a block diagram of a computer system 1300 that can implement the aforementioned memory management processes. The computing system 1300 includes a bus 1305 or other communication component for communicating information and a processor 1310 or processing module coupled to the bus 1305 for processing information. The computing system 1300 also includes a main memory 1315, such as a RAM or other dynamic storage device, coupled to the bus 1305 for storing information, and instructions to be executed by the processor 1310. The main memory 1315 can also be used for storing objects during execution of instructions by the processor 1310. The computing system 1300 may further include a ROM 1320 or other static storage device coupled to the bus 1305 for storing static information and instructions for the processor 1310. A storage device 1325, such as a solid state device, magnetic disk or optical disk, is coupled to the bus 1305 for persistently storing information and instructions. Computing device 1300 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 1300 may be coupled via the bus 1305 to a display 1335, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 1330, such as a keyboard including alphanumeric and other keys, may be coupled to the bus 1305 for communicating information and command selections to the processor 1310. In another implementation, the input device 1330 may be integrated with the display 1335, such as in a touch screen display. The input device 1330 can include a cursor control, such as a mouse, a trackball, or cursor direction keys, for communicating direction information and command selections to the processor 1310 and for controlling cursor movement on the display 1335.

According to various implementations, the processes and/or methods described herein can be implemented by the computing system 1300 in response to the processor 1310 executing an arrangement of instructions contained in the main memory 1315. Such instructions can be read into the main memory 1315 from another computer-readable medium, such as the storage device 1325. Execution of the arrangement of instructions contained in the main memory 1315 causes the computing system 1300 to perform the illustrative processes and/or method steps described herein. One or more processors in a multi-processing arrangement may also be employed to execute the instructions contained in the main memory 1315. In alternative implementations, hard-wired circuitry may be used in place of or in combination with software instructions to effect illustrative implementations. Thus, implementations are not limited to any specific combination of hardware circuitry and software.

Although an example computing system 1300 has been described in FIG. 17, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus or processing module on data stored on one or more computer-readable storage devices or received from other sources.

The term "data processing apparatus" or "computing device" or "processing module" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, embodiments of the subject matter described in this specification can be implemented on a computing device having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A computer-implemented method for managing the allocation of memory comprising:
   activating a processing thread;
   allocating memory for the processing thread, wherein the allocated memory includes a first region having a plurality of segments;
   determining if data associated with an object utilized by the processing thread is to be stored in the first region of the allocated memory;
   determining if the data associated with the object can be stored in a first segment of the plurality of segments;
   storing the data associated with the object in the first segment in response to the determination that the data associated with the object can be stored in the first segment; and
   the processing thread including code performing a garbage collection process on the allocated first segment prior to termination of the processing thread.

2. The method of claim 1 further comprising:
   allocating a second segment of the plurality of segments in response to a determination that the data associated with the object cannot be stored in the first segment;
   dividing the data associated with the object into a first portion of the data associated with the object and a second portion of the data associated with the object; and
   storing the first portion of the data associated with the object in the first segment and storing the second portion of the data associated with the object in the second segment of the plurality of segments.

3. The method of claim 2 further comprising:
   determining if a number of segments allocated to the processing thread exceed a predetermined value.

4. The method of claim 3 further comprising:
   performing a garbage collection process on the first segment and the second segments if the number of segments allocated to the processing thread exceed the predetermined value.

5. The method of claim 3 further comprising:
   terminating the processing thread if the number of segments allocated to the processing thread exceed the predetermined value.

6. The method of claim 1 further comprising:
   determining if the data associated with the object can be stored in a second region of the allocated memory if the data associated with the object cannot be stored in the first region;
   allocating the portion of the second region for storing the data associated with the object in response to the determination that the data associated with the object can be stored in the second region and in response to the determination that the data associated with the object cannot be stored in the first region; and
   storing the data associated with the object at the allocated portion of the second region in response to the determination that the data associated with the object cannot be stored in the first region.

7. The method of claim 1 further comprising:
   determining if the data associated with the object can be stored in a portion of a second region of the allocated memory in response to the determination that the data associated with the object cannot be stored in the first segment; and
   the processing thread performing a garbage collection process on a portion of the second region if the data associated with the object cannot be stored in the second region.

8. The method of claim 7 further comprising:
   determining if the data associated with the object can be stored in a portion of the second region after the garbage collection process;
   allocating the portion of the second region for storing the data associated with the object in response to the determination that the data associated with the object can be stored in the portion; and
   storing the data associated with the object at the allocated portion of the second region.

9. The method of claim 1, wherein the garbage collection process is a mark and sweep process.

10. The method of claim 1, wherein the garbage collection process is a copying collection process.

11. A system comprising:
a memory having a first region that includes a plurality of segments; and
a storage device storing instructions that, when executed by a processing module of the system, cause the processing module to perform operations comprising:
activating a processing thread;
allocating a first segment of the plurality of segments for the processing thread,
determining if data associated with an object is to be stored in the memory,
determining if the data associated with the object can be stored in the allocated first segment,
determining if the plurality of segments has an allocatable second segment in response to the determination that the data associated with the object cannot be stored in the allocated first segment,
if the data associated with the object cannot be stored in the allocated first segment and the first region has an allocatable second segment:
allocating the second segment of the plurality of segments for the processing thread, and
storing the data associated with the object at the allocated portion of the second segment, and
the processing thread including code performing a garbage collection process on the first segment and the second segment prior to termination of the processing thread.

12. The system of claim 11, wherein the operations further comprise:
determining if a number of segments allocated to the processing thread exceed a predetermined value.

13. The system of claim 12, wherein the operations further comprise:
performing a garbage collection process on the first segment and the second segment if the number of segments allocated to the processing thread exceed the predetermined value.

14. The system of claim 12, wherein the operations further comprise:
terminating the processing thread if the number of segments allocated to the processing thread exceed the predetermined value.

15. The system of claim 11, wherein the operations further comprise:
if the data associated with the object cannot be stored in the allocated first segment and the first region does not have an allocatable second segment:
determining if the data associated with the object can be stored in a second region of the memory,
allocating the portion of the second region for storing the data associated with the object, and
storing the data associated with the object at the allocated portion of the second region.

16. A non-transitory computer-readable storage device storing instructions that, when executed by a processing module, cause the processing module to perform operations comprising:
activating a processing thread;
allocating a memory for the processing thread, wherein the allocated memory includes a first region having a plurality of segments to store data for objects to be created during the processing performed by the processing thread;
storing data associated with an object in a first segment of the plurality of segments;
the processing thread including code performing a garbage collection process on the plurality of segments prior to termination of the processing thread; and
releasing the plurality of segments.

17. The non-transitory computer-readable storage device of claim 16, storing instructions to perform operations further comprising:
determining if a number of segments of the plurality of segments allocated to the processing thread exceed a predetermined value; and
terminating the processing thread if the number of segments of the plurality of segments allocated to the processing thread exceed the predetermined value.

18. The non-transitory computer-readable storage device of claim 16, storing instructions to perform operations further comprising:
determining if data associated with a second object can be stored in the plurality of segments,
if the data associated with a second object cannot be stored in the plurality of segments:
determining if the data associated with the second object can be stored in a portion of a second region of the allocated memory,
allocating the portion of the second region for storing the data associated with the second object, and
storing the data associated with the second object at the allocated portion of the second region.

19. The non-transitory computer-readable storage device of claim 16, wherein the plurality of segments of the memory for the processing thread are automatically allocated by a runtime system.

20. The non-transitory computer-readable storage device of claim 19, wherein the runtime system is a Java® runtime system.

* * * * *